(12) United States Patent
Takao et al.

(10) Patent No.: US 9,319,587 B2
(45) Date of Patent: Apr. 19, 2016

(54) IMAGE PICKUP APPARATUS, IMAGE PICKUP METHOD, AND COMPUTER PROGRAM PRODUCT

(71) Applicant: JVC KENWOOD Corporation, Yokohama-shi (JP)

(72) Inventors: Kazuyuki Takao, Ebina (JP); Hidehiro Katoh, Ohta-ku (JP); Teppei Kubota, Yokohama (JP); Atsushi Sugita, Yokohama (JP); Kensuke Taguchi, Kawasaki (JP); Kazuhiko Kobayashi, Kawasaki (JP); Takashi Sueda, Yokohama (JP); Hiroshi Furuta, Yokohama (JP); Hiroki Nishioka, Yokohama (JP); Masamichi Nishioka, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 142 days.

(21) Appl. No.: 14/244,659

(22) Filed: Apr. 3, 2014

(65) Prior Publication Data

US 2014/0300765 A1 Oct. 9, 2014

(30) Foreign Application Priority Data

Apr. 5, 2013 (JP) .................................. 2013-079929

(51) Int. Cl.
H04N 5/232 (2006.01)

(52) U.S. Cl.
CPC ....... *H04N 5/23254* (2013.01); *H04N 5/23274* (2013.01)

(58) Field of Classification Search
None
See application file for complete search history.

(56) References Cited

U.S. PATENT DOCUMENTS

2007/0046783 A1* 3/2007 Shimada ............ H04N 5/23248
348/208.99

FOREIGN PATENT DOCUMENTS

JP 07-123317 5/1995

* cited by examiner

*Primary Examiner* — Twyler Haskins
*Assistant Examiner* — Angel L Garces-Rivera
(74) *Attorney, Agent, or Firm* — Venable LLP; Michael A. Sartori; Todd R. Farnsworth

(57) ABSTRACT

Provided is an image pickup apparatus that includes: an image pickup unit configured to generate picked-up image data by an image pickup process; a camera shake detection unit configured to detect an angular velocity generated by camera shake when shooting; an electronic image stabilization unit configured to perform an image stabilization process by moving a position of a cropping area in the picked-up image data, based on the angular velocity detected by the camera shake detection unit; and an area changing unit configured to change a size of the cropping area with respect to the picked-up image data, based on the angular velocity detected by the camera shake detection unit.

19 Claims, 20 Drawing Sheets

FIG.1
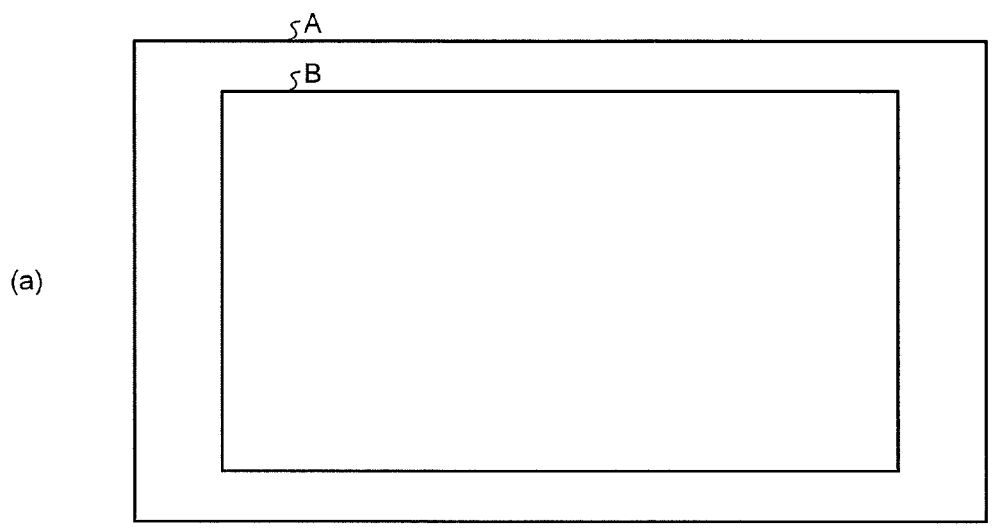
(a)
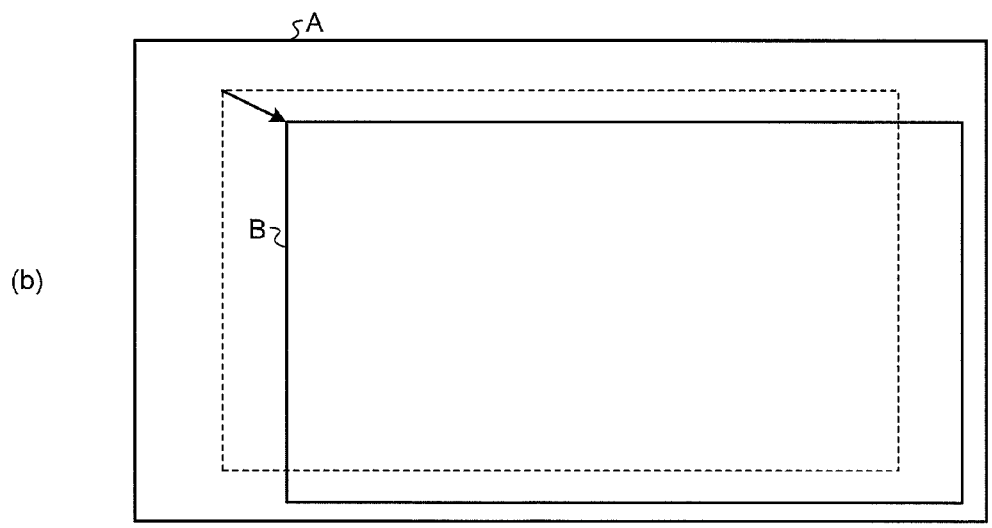
(b)

FIG.2
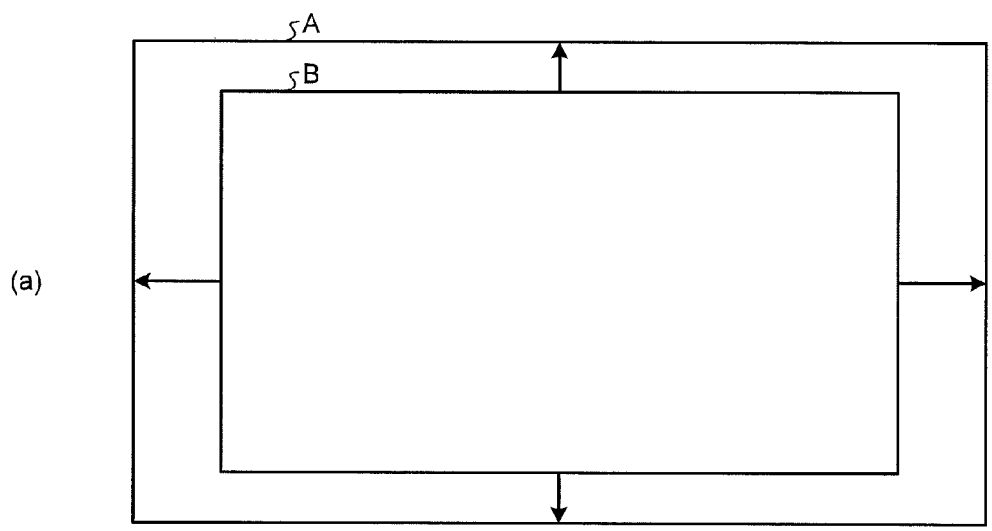
(a)
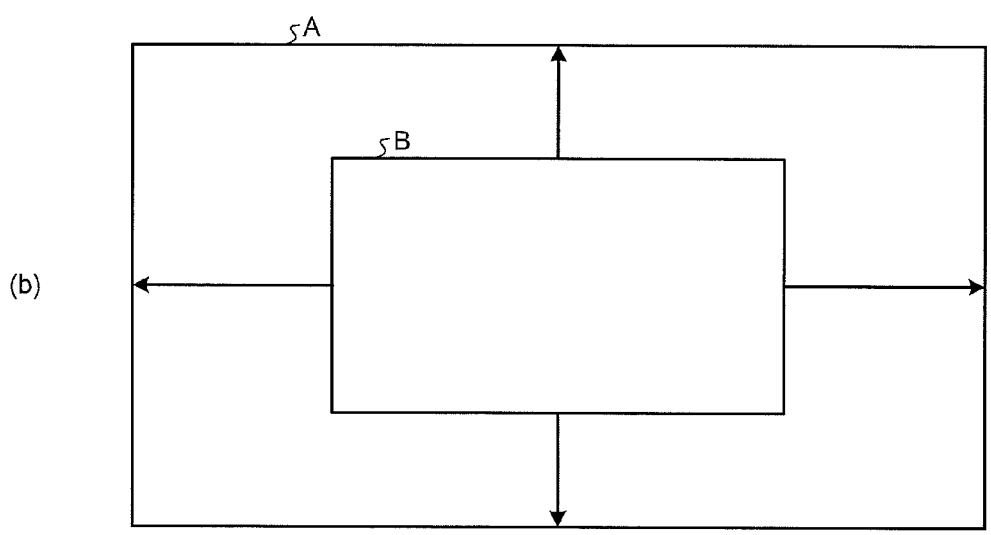
(b)

IMAGE PICKUP APPARATUS, IMAGE PICKUP METHOD, AND COMPUTER PROGRAM PRODUCT

CROSS-REFERENCE TO RELATED APPLICATIONS

The present application claims priority to and incorporates by reference the entire contents of Japanese Patent Application No. 2013-079929 filed in Japan on Apr. 5, 2013.

BACKGROUND OF THE INVENTION

1. Field of the Invention

The present invention relates to an image pickup apparatus, an image pickup method, and a computer program product.

2. Description of the Related Art

In recent years, electronic image stabilization has been widely used in which image stabilization is performed by displacing the position of a cropping area (area to be displayed as an image) in picked-up image data, depending on detected camera shake. In performing this type of electronic image stabilization, the picked-up image data include the cropping area and a marginal zone (hereinafter, referred to as a buffer zone) for the cropping area when moved.

For example, Japanese Patent Application Laid-open No. 7-123317 discloses an image pickup apparatus having a vibration-reduction-function. The image pickup apparatus having the vibration-reduction-function displaces the position of an image read out from the field memory, depending on the amount of movement of image information between frames. With this arrangement, the image pickup apparatus having the vibration-reduction-function reduces the blur of the read-out image.

However, since the size of the picked-up image data cannot be changed, the size of the cropping area affects the image stabilization and the resolution in such electronic image stabilization as described above. When the cropping area is large, the high resolution in the cropping area is realized; however, the buffer zone is made to be small, whereby it is difficult to secure an amount of camera-shake-correction. On the other hand, when the cropping area is small, the buffer zone is wide, and the amount of camera-shake-correction is secured; however, the resolution in the cropping area is decreased. As described above, there is a problem that it is difficult to set a size of the cropping area since a required size of cropping area depends on image pickup conditions.

SUMMARY OF THE INVENTION

There is a need to at least partially solve the problems in the conventional technology.

Provided is an image pickup apparatus that includes: an image pickup unit configured to generate picked-up image data by an image pickup process; a camera shake detection unit configured to detect an angular velocity generated by camera shake when shooting; an electronic image stabilization unit configured to perform an image stabilization process by moving a position of a cropping area in the picked-up image data, based on the angular velocity detected by the camera shake detection unit; and an area changing unit configured to change a size of the cropping area with respect to the picked-up image data, based on the angular velocity detected by the camera shake detection unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram for illustrating electronic image stabilization according to a first embodiment;

FIG. 2 is a diagram illustrating change in a size of a cropping area according to the first embodiment;

DETAILED DESCRIPTION OF THE PREFERRED EMBODIMENTS

First Embodiment

Figure 3:
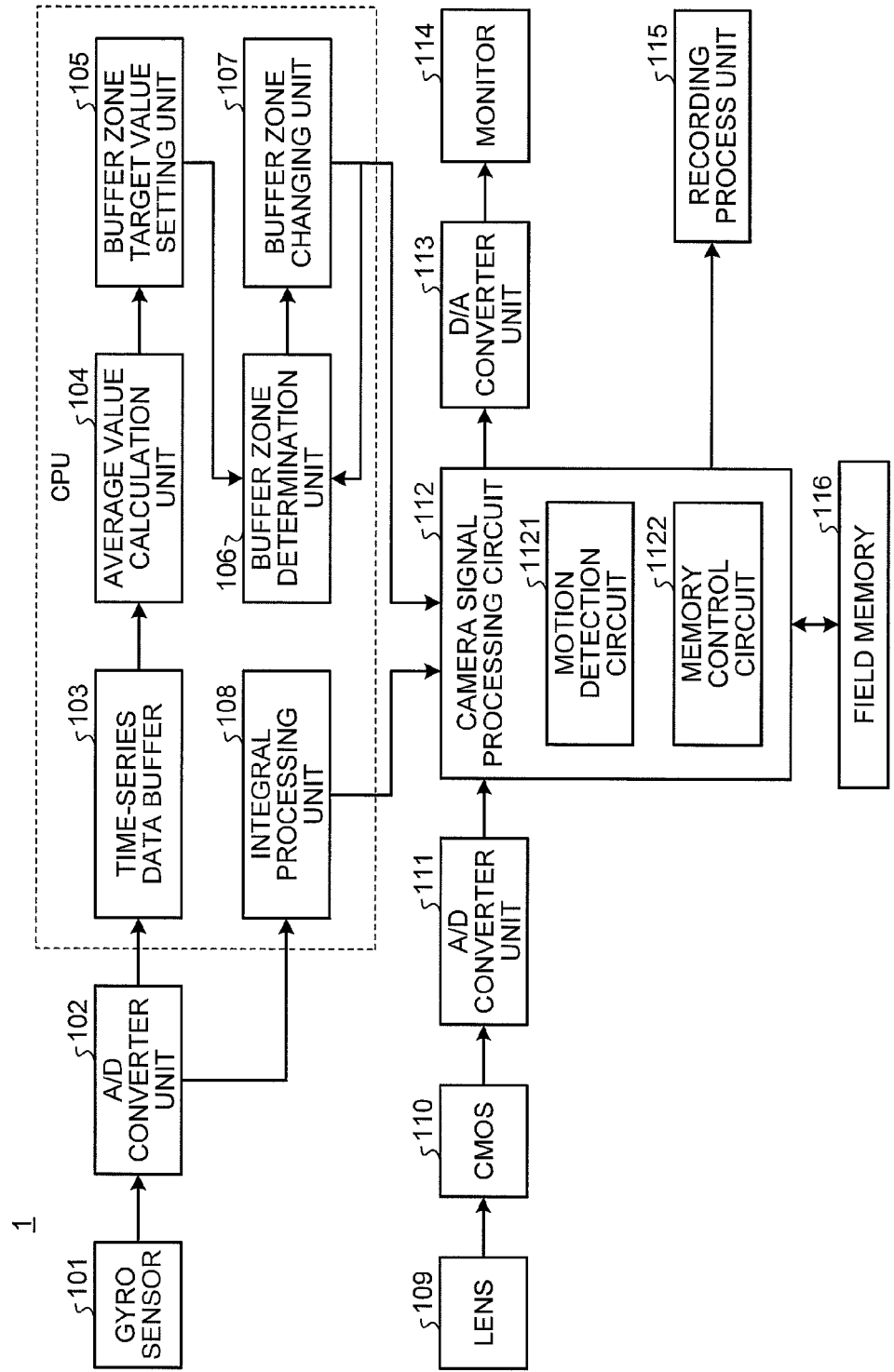
FIG. 3 is a block diagram of an image pickup apparatus according to the first embodiment.

With reference to the drawing, a first embodiment will be described below. An image pickup apparatus according to the present embodiment has an electronic image stabilization function. The electronic image stabilization changes a position of an area (cropping area), to be recorded and displayed, in picked-up image data which are picked up by an image sensor such as CMOS, depending on a direction and an amount of camera shake.

With reference to FIG. 1, the electronic image stabilization will be specifically described. FIGS. 1A and 1B are diagrams illustrating a position of a cropping area B in a picked-up image data A. In FIG. 1A, the cropping area B is located at the center of the picked-up image data A. Then, when the camera shake is detected, the image pickup apparatus moves the cropping area B in the arrow direction. This arrangement can reduce blur of an image in the cropping area B even when the image in the picked-up image data A is blurred.

In addition, the image pickup apparatus can change the size (area) of the cropping area B depending on an angular velocity generated by the camera shake. For example, as illustrated in FIGS. 2A and 2B, the image pickup apparatus can change the size of the cropping area B in the picked-up image data A. The cropping area B illustrated in the FIG. 2A has a larger size than the cropping area B illustrated in FIG. 2B.

Here, the size (area) of the picked-up image data A is uniquely set depending on the size of a light receiving area of the image sensor such as CMOS. In other words, the size of the picked-up image data A does not change. On the other hand, the cropping area B is an area in which image data is cropped (read out) from the picked-up image data A. Thus, the image pickup apparatus can change the size of the cropping area B by adjusting the coordinate and the like which specifies the cropping area B. As the cropping area B becomes larger, a marginal zone in which the cropping area B can move becomes smaller (see FIG. 2A). On the other hand, as the size of the cropping area B becomes smaller, the marginal zone in which the cropping area B can move becomes lager (see FIG. 2B). In the following descriptions, the marginal zone (an area which is in the picked-up image data A and is other than the cropping area B), in which the cropping area B can move, is referred to as a buffer zone.

Note that when the size of the cropping area changes, the pixel count of the cropping area in a frame changes. When the size of the cropping area changes during recording, the image pickup apparatus adjusts the pixel count of a frame by magnifying or demagnifying the image in the cropping area, so that the pixel count of the frame of a video file being recorded will be a video file that has a previously set pixel count.

Configuration of Image Pickup Apparatus 1

Subsequently, with reference to the block diagram illustrated in FIG. 3, a configuration of an image pickup apparatus 1 according to the present embodiment will be described. The image pickup apparatus 1 includes a gyro sensor 101, an A/D converter unit 102, a time-series data buffer 103, an average value calculation unit 104, a buffer zone target value setting unit 105, a buffer zone determination unit 106, a buffer zone changing unit 107, an integral processing unit 108, a lens 109, a CMOS 110, an A/D converter unit 111, a camera signal processing circuit 112, a D/A converter unit 113, a monitor 114, a recording process unit 115, and a field memory 116.

The gyro sensor 101 (camera shake detection unit) detects information related to the camera shake when shooting. For example, the gyro sensor 101 detects an angular velocity, an angle, and the like of the image pickup apparatus 1 when the camera is shaking. The A/D converter unit 102 converts the angular velocity of analogue data detected by the gyro sensor 101 into digital data. The A/D converter unit 102 outputs the converted digital data to the time-series data buffer 103 and the integral processing unit 108.

The time-series data buffer 103 is a buffer memory for storing the digital data of the angular velocities output from the A/D converter unit 102 in time series. That is to say, the time-series data buffer 103 stores at every predetermined time the angular velocity output from the A/D converter unit 102 and stores the plurality of digital data of the angular velocities arranged in time series.

The average value calculation unit 104 calculates an average value of the angular velocities stored in the time-series data buffer 103. The average value calculation unit 104 outputs the calculated average value of the angular velocities to the buffer zone target value setting unit 105.

The buffer zone target value setting unit 105 sets a target value of the size of the buffer zone based on the average value of the angular velocities. The buffer zone determination unit 106 compares the target value of the size of the buffer zone and the size of the current buffer zone, and determines whether to increase, decrease, or maintain the size of the buffer zone, based on a result of the comparison. Then, the buffer zone determination unit 106 outputs an instruction depending on a result of the determination to the buffer zone changing unit 107. The buffer zone changing unit 107 increases or decreases the buffer zone depending on the determination result of the buffer zone determination unit 106. The buffer zone changing unit 107 outputs information about the changed buffer zone to the buffer zone determination unit 106 and the camera signal processing circuit 112. Note that the process of change of the size of the above-described buffer zone will be described later in detail.

The integral processing unit 108 performs an integral operation on the digital data of the angular velocities output from the A/D converter unit 102. With this operation, the angular velocities detected by the gyro sensor are converted into an angle. The integral processing unit 108 calculates a camera shake amount by using the calculated value of integral (angle). Then, the integral processing unit 108 outputs the calculated camera shake amount to the camera signal processing circuit 112.

The lens 109 is a lens group including a plurality of lenses such as a zoom lens and a focusing lens. The CMOS 110 (image pickup unit) photoelectrically converts the light passing through the lens 109 to generate an analogue image signal of an object. The A/D converter unit 111 converts the analogue image signal into a digital signal. With this arrangement, an image pickup process is The camera signal processing circuit 112 performs processes generally related to the image data processes such as displaying and recording an image, an image stabilization process, and a conversion process of the cropping area. The camera signal processing circuit 112 has a motion detection circuit 1121 and a memory control circuit 1122.

The motion detection circuit 1121 calculates vector data (motion vector) based on positional change of pixels between frames. Specifically, the motion detection circuit 1121 calculates the vector data indicating a direction and an amount of displacement of the pixels based on the positional change of pixels between frames. Note that the calculation of the vector data is a known technique, and an existing method can be used.

The memory control circuit 1122 (electronic image stabilization unit) stores the picked-up image data output from the A/D converter unit 111 into the field memory 116. In addition, the memory control circuit 1122 calculates a camera shake amount which offsets the camera shake amount output from the integral processing unit 108. Then, the memory control circuit 1122 crops the cropping area from the picked-up image data based on an amount of camera-shake-correction. That is to say, the memory control circuit 1122 reads out, in the picked-up image data stored in the field memory 116, the image data from the position corresponding to the angle (camera shake amount) of the image pickup apparatus 1. This arrangement realizes an electronic image stabilization process.

Further, the size of the area cropped from the picked-up image data by the memory control circuit 1122 is determined depending on the size of the buffer zone output from the buffer zone changing unit 107. As information representing the size of the buffer zone, used is information or the like specifying pixel counts of the buffer zones in the horizontal direction and the vertical direction when the cropping area is located at the center of the picked-up image data. For example, as the information representing the size of the buffer zone, the pixel count (the length of the upward direction arrow in FIG. 2) from the upper end of the picked-up image data to the upper end of the cropping area or the like can be used. Since the size of the picked-up image data is a uniquely fixed amount fixed by the size of a light receiving area of the CMOS 110, when the size of the buffer zone is determined, the size of the cropping area is automatically determined.

The D/A converter unit 113 converts the digital image data in the area (cropping area) read out by the memory control circuit 1122 from the field memory 116 into analog signal. The monitor 114 (display unit) is an LCD (Liquid Crystal Display) and the like for example. The monitor 114 displays the image of the cropping area based on the analog image data output from the D/A converter unit 113. The recording process unit 115 performs, on response to a recording operation by a user, a recording process by storing the digital image data of the area (cropping area) read out by the memory control circuit 1122 from the field memory 116 into a memory (not illustrated in the drawings).

Details of Buffer Zone Changing Process

Figure 4:
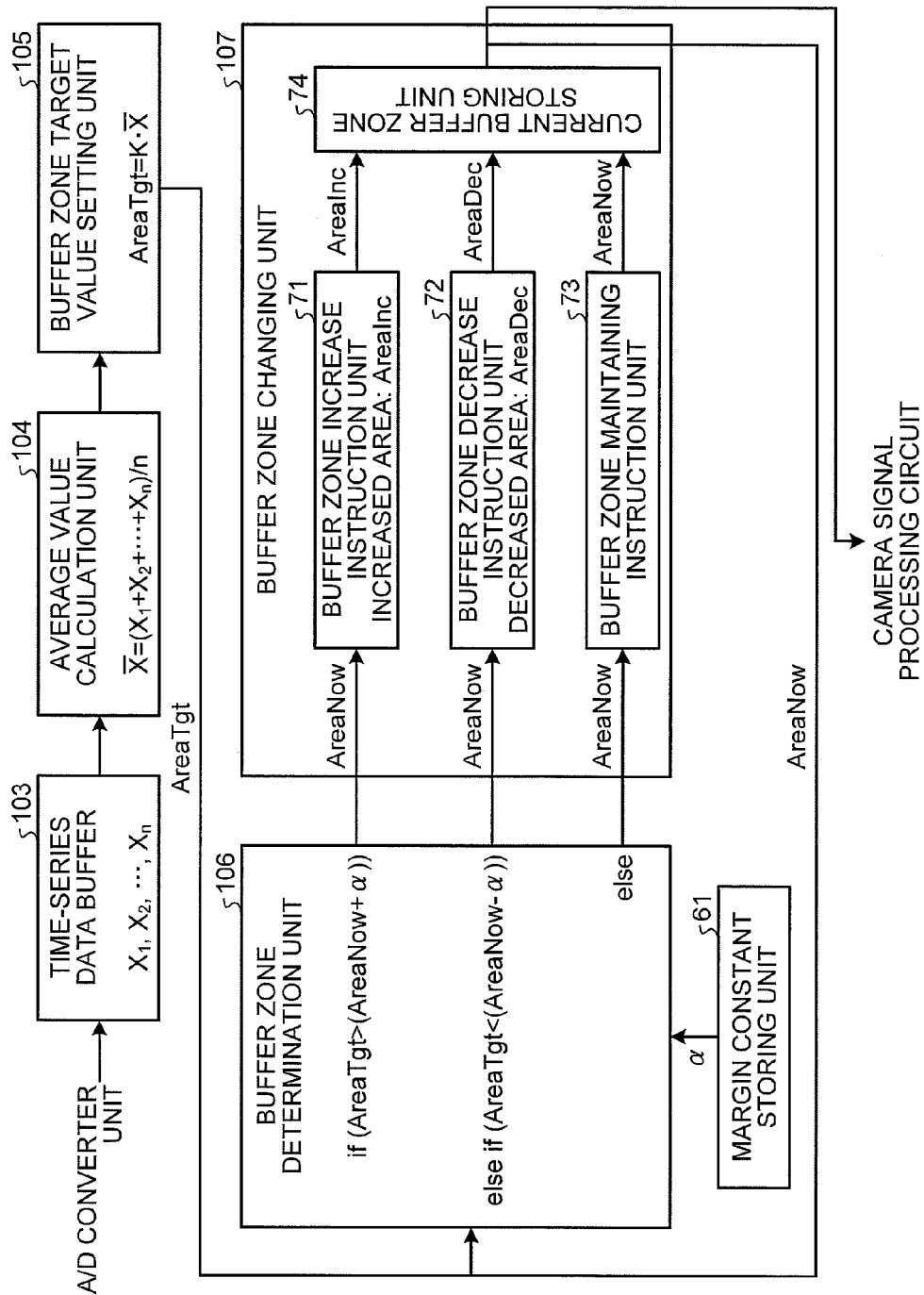
FIG. 4 is a detailed block diagram of the image pickup apparatus according to the first embodiment.

Here, a buffer zone changing process will be described in detail with reference to a block diagram illustrated in FIG. 4. FIG. 4 is a diagram illustrating detailed processes and configurations of the time-series data buffer 103, the average value calculation unit 104, the buffer zone target value setting unit 105, the buffer zone determination unit 106, and the buffer zone changing unit 107.

First, the time-series data buffer 103 obtains digital-converted angular velocities from the A/D converter unit 102 in time series and holds a predetermined number (n in FIG. 4) of angular velocity data X1-Xn. The average value calculation unit 104 obtains a plurality of angular velocity data held in the time-series data buffer 103 and calculates the average value of the angular velocities by using the following Equation (1). The average value calculation unit 104 outputs the calculated average value to the buffer zone target value setting unit 105. Note that X-bar in Equation (1) represents an average value.

$$\bar{X} = \frac{(X_1 + X_2 + \ldots + X_n)}{n} \quad (1)$$

The buffer zone target value setting unit 105 (target-value-of-area calculation unit) obtains the average value of the angular velocities and calculates a target value (hereinafter, referred to as a buffer zone target value AreaTgt) of the size of the buffer zone by using the following Equation (2). At this time, K in Equation (2) is a coefficient for converting the angular velocity into the target value of the buffer zone and is a previously set parameter. The buffer zone target value setting unit 105 outputs the buffer zone target value AreaTgt to the buffer zone determination unit 106.

$$\mathrm{Area}Tgt = K \cdot \bar{X} \quad (2)$$

To the buffer zone determination unit 106 (change determination unit), input are the buffer zone target value AreaTgt, a value representing the size of the current buffer zone (hereinafter, referred to as a current buffer zone AreaNow), and a margin constant α. The buffer zone determination unit 106 compares a magnitude relation between the buffer zone target value AreaTgt and the current buffer zone AreaNow and determines, based on the result of the comparison, whether to increase, decrease, or maintain the size of the buffer zone. Note that the margin constant α is a value representing a margin to be used to compare the magnitude relation and is a previously set parameter. The margin constant α is stored in a margin constant storing unit 61.

Specifically, when the relation (the buffer zone target value AreaTgt)>(the current buffer zone AreaNow+α) is satisfied, the buffer zone determination unit 106 determines to increase the size of the buffer zone. Alternatively, when the relation (the buffer zone target value AreaTgt<(current buffer zone AreaNow−α) is satisfied, the buffer zone determination unit 106 determines to decrease the size of the buffer zone. Alternatively, in the case other than the above cases, the buffer zone determination unit 106 determines to maintain the size of the buffer zone. In other words, when the relation (the current buffer zone AreaNow−α)<the buffer zone target value AreaTgt<(the current buffer zone AreaNow+α) is satisfied, the buffer zone determination unit 106 determines to maintain the size of the buffer zone.

The buffer zone changing unit 107 (an area changing unit) has a buffer zone increase instruction unit 71, a buffer zone decrease instruction unit 72, a buffer zone maintaining instruction unit 73, and a current buffer zone storing unit 74.

The buffer zone increase instruction unit 71 calculates, when the buffer zone determination unit 106 has determined to increase the size of the buffer zone, an increased area AreaInc by adding a previously set predetermined increase-amount to the current buffer zone AreaNow. That is to say, the increased area AreaInc to be output from the buffer zone increase instruction unit 71 is larger than the current buffer zone AreaNow input into the buffer zone increase instruction unit 71. Then, the buffer zone increase instruction unit 71 outputs the calculated increased area AreaInc to the current buffer zone storing unit 74.

The buffer zone decrease instruction unit 72 calculates, when the buffer zone determination unit 106 has determined to decrease the size of the buffer zone, a decreased area AreaDec by subtracting a previously set predetermined decrease-amount from the current buffer zone AreaNow. That is to say, a decreased area AreaDec to be output from the buffer zone decrease instruction unit 72 is smaller than the current buffer zone AreaNow input into the buffer zone decrease instruction unit 72. Then, the buffer zone decrease instruction unit 72 outputs the calculated decreased area AreaDec to the current buffer zone storing unit 74.

The buffer zone maintaining instruction unit 73 outputs, when the buffer zone determination unit 106 has determined to maintain the size of the buffer zone, the input current buffer zone AreaNow to the current buffer zone storing unit 74 as it is.

The current buffer zone storing unit 74 is a memory for storing the size of the current buffer zone. Specifically, the current buffer zone storing unit 74 stores the increased area AreaInc output from the buffer zone increase instruction unit 71; the decreased area AreaDec output from the buffer zone decrease instruction unit 72; or the current buffer zone AreaNow output from the buffer zone maintaining instruction unit 73, as the current buffer zone AreaNow. Then, the current buffer zone storing unit 74 outputs the stored current buffer zone AreaNow to the buffer zone determination unit 106 and the camera signal processing circuit 112.

With this arrangement, the size (area) of the buffer zone in the picked-up image data changes depending on the angular velocity. In other words, the size (area) of the cropping area in the picked-up image data changes depending on the camera shake amount. With this arrangement, when the camera shake amount is large, the buffer zone for correcting the camera shake can be secured large. On the other hand, when the camera shake amount is small, the buffer zone is made small to keep the cropping area large so that a quality (resolution) of image can be improved. Therefore, the image pickup apparatus 1 can optimize the size of the cropping area depending on the camera shake.

At this time, when the size of the buffer zone changes, the size of the cropping area also changes. In other words, when the size of the buffer zone changes, an angle of view of the cropping area changes. Thus, there is a possibility that when the size of the buffer zone changes, the user has a visually uncomfortable feeling. In particular, when the buffer zone decreases, it is a state that the camera shake amount is small, and the quality of the cropped image is thus stable. Thus, the change in the angle of view of the cropping area is easily noticed by the user. On the other hand, when the buffer zone increases, it is a situation that the camera shake amount is large; thus, the quality of image in the cropping area is unstable, whereby the angle change of view of the cropping area is not easily noticed by the user.

Figure 5:
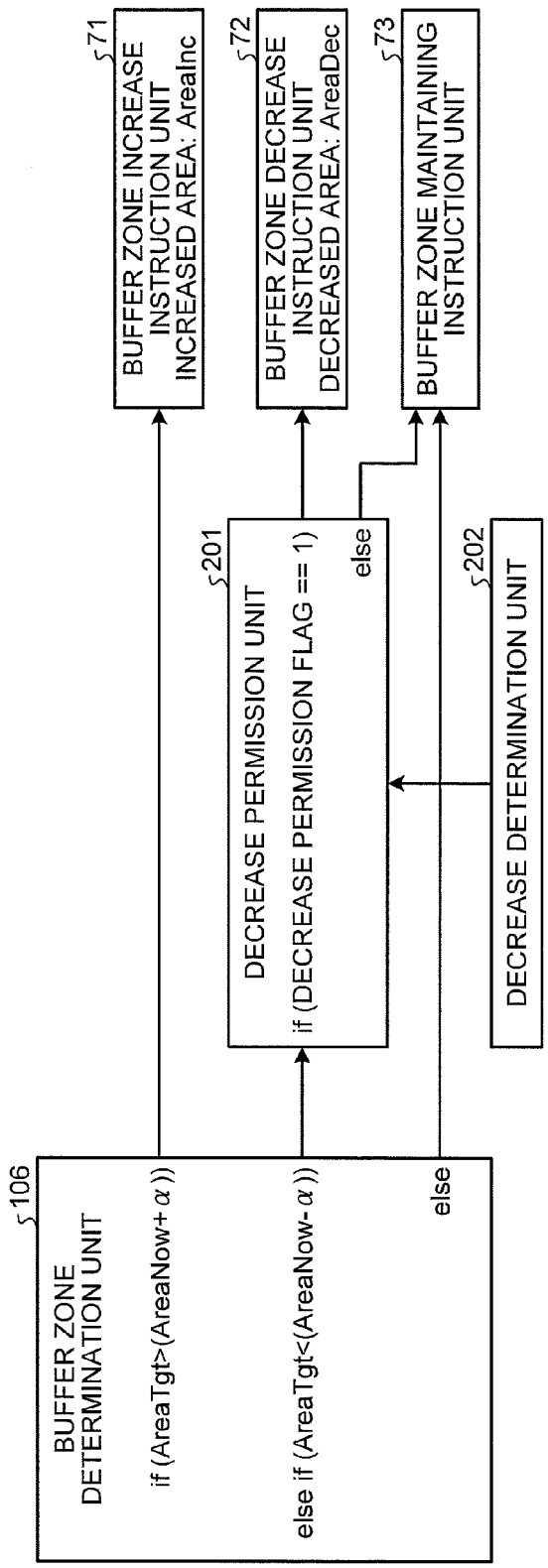
FIG. 5 is a diagram for illustrating a decrease permission unit and a decrease determination unit according to the first embodiment.

For this reason, the image pickup apparatus 1 may be made to decrease the buffer zone only in a predetermined image pickup condition. Specifically, as illustrated in FIG. 5, between the buffer zone determination unit 106 and the buffer zone decrease instruction unit 72, there may be provided a decrease permission unit 201 (permission unit) for permitting the decrease of the buffer zone. The decrease permission unit 201 permits the decrease of the buffer zone based on an instruction of the user or on the predetermined image pickup condition. The decrease permission unit 201 instructs, when the decrease of the buffer zone is not permitted, the buffer zone maintaining instruction unit 73 to maintain the size of the buffer zone.

A decrease determination unit 202 (condition determination unit) determines whether or not the predetermined image pickup condition for the decrease permission unit 201 to permit the decrease of the buffer zone is satisfied. At this time, the predetermined image pickup condition represents an image pickup condition under which the change in the angle of view is not easily noticed; an image pickup condition under which a picked-up image is not affected by the change in the angle of view; or the like. For example, as the predetermined image pickup condition, can be used various conditions such as conditions related to an image pickup mode, conditions related to the image data to be picked up, and conditions related to the camera shake amount. The decrease determination unit 202 outputs, when the predetermined image pickup condition is satisfied, "1" as a decrease permission flag to the decrease permission unit 201. On the other hand, the decrease determination unit 202 outputs, when the predetermined image pickup condition is not satisfied, "0" as a decrease permission flag to the decrease permission unit 201.

The decrease permission unit 201 determines, based on the determination result of the decrease determination unit 202, whether or not to permit the decrease. That is to say, when the decrease permission flag is "1", the decrease permission unit 201 permits the decrease. On the other hand, when the decrease permission flag is other than "1" that is "0", the decrease permission unit 201 does not permit the decrease. Thus, in the case that the decrease permission unit 201 is provided, when the buffer zone determination unit 106 determines to decrease the buffer zone, and the predetermined image pickup condition is not satisfied, the buffer zone is not decreased; and the size of the current buffer zone is maintained. Note that the predetermined image pickup condition will be described in detail in the embodiment to be described later.

As described above, when the image pickup apparatus 1 has the decrease permission unit 201, the decrease of the buffer zone can be permitted only when the change in the angle of view is not easily noticed. As a result, it is possible to reduce the visual uncomfortable feeling given to the user by the change of the buffer zone (change of the cropping area).

Second Embodiment

Figure 6:
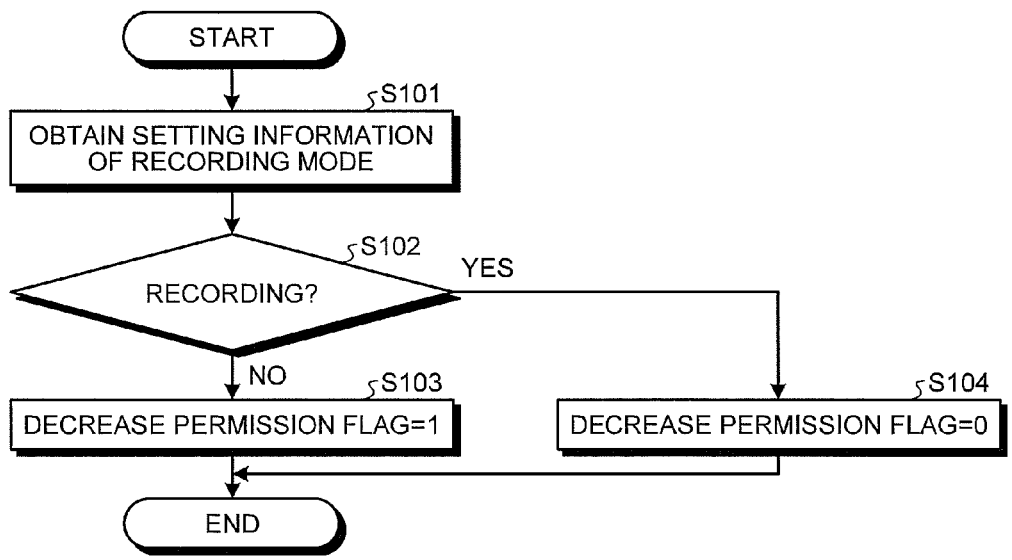
FIG. 6 is a flowchart illustrating an operation of a decrease determination unit according to a second embodiment.

A second embodiment will be described. In the present embodiment, the decrease determination unit 202 determines the value of the decrease permission flag based on a recording mode. FIG. 6 shows a flowchart illustrating an operation of the decrease determination unit 202 according to the present embodiment.

First, the decrease determination unit 202 obtains setting information of the recording mode of the image pickup apparatus 1 (step S101). The setting information of the recording mode is information representing whether the image pickup apparatus 1 is performing or stopping the recording operation of the image data in the cropping area. For example, the decrease determination unit 202 obtains the setting information of the recording mode from the camera signal processing circuit 112.

Next, the decrease determination unit 202 refers to the setting information of the recording mode to determine whether or not the image pickup apparatus 1 is performing the recording operation (step S102). When the image pickup apparatus 1 is stopping the recording operation (step S102: No), the decrease determination unit 202 sets the value of the decrease permission flag to be "1" (step S103). On the other hand, when the image pickup apparatus 1 is performing the recording operation (step S102: Yes), the decrease determination unit 202 sets the value of the decrease permission flag to be "0" (step S104). The decrease determination unit 202 outputs the set decrease permission flag to the decrease permission unit 201.

As described above, with the configuration of the decrease determination unit 202 according to the present embodiment, when the image pickup apparatus 1 is stopping the recording operation (during a live view, for example), the decrease permission flag is set "1". Thus, when stopping the recording operation, the decreasing process of the buffer zone is performed, and the angle of view of the cropping area changes; however, the image data in the cropping area are not being recorded, whereby there is no problem. On the other hand, when performing the recording, the process of decreasing the buffer zone is not performed. As described above, the angle of view of the cropping area is not changed for the image data being recorded. As a result, the image data giving no visually uncomfortable feeling can be recorded.

Third Embodiment

Figure 7:
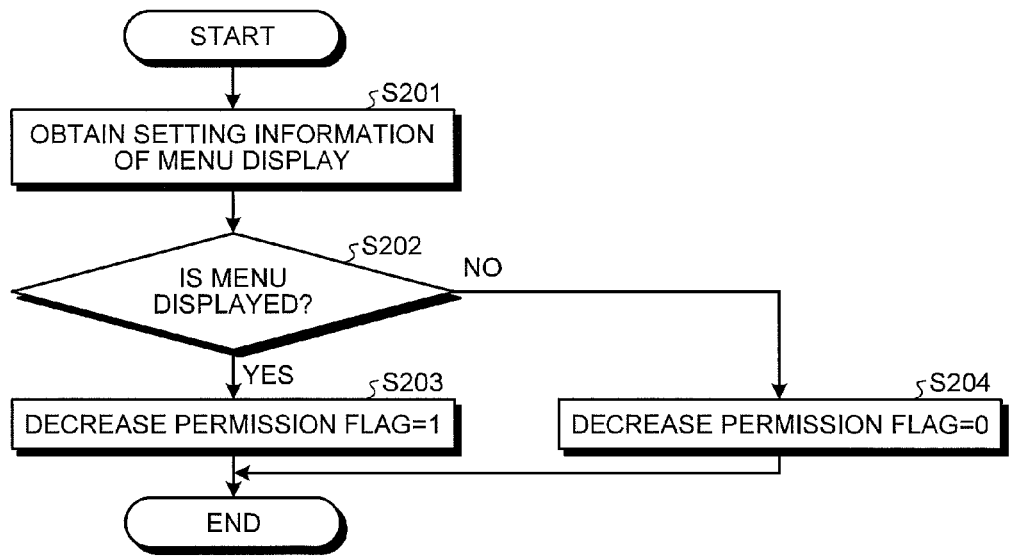
FIG. 7 is a flowchart illustrating an operation of a decrease determination unit according to a third embodiment.

A third embodiment will be described. In the present embodiment, the decrease determination unit 202 determines the value of the decrease permission flag based on existence or non-existence of a menu display. FIG. 7 shows a flowchart illustrating an operation of the decrease determination unit 202 according to the present embodiment.

First, the decrease determination unit 202 obtains setting information of the menu display (step S201). The setting information of the menu display is information representing whether or not an OSD (On Screen Display) menu is displayed on the monitor 114. For example, the decrease determination unit 202 obtains the setting information of the menu display from the camera signal processing circuit 112.

Next, the decrease determination unit 202 refers to the setting information of the menu display to determine whether or not the menu is being displayed (step S202). In other words, the decrease determination unit 202 determines whether or not the menu screen is being displayed on the image in cropping area displayed on the monitor 114.

When the menu is displayed (step S202: Yes), the decrease determination unit 202 sets the decrease permission flag to be "1" (step S203). On the other hand, the menu is not being displayed (step S202: No), the decrease determination unit 202 sets the decrease permission flag to be "0" (step S204). The decrease determination unit 202 outputs the set decrease permission flag to the decrease permission unit 201.

As described above, with the configuration of the decrease determination unit 202 according to the present embodiment, when the menu screen is displayed on the image (the image in the cropping area) displayed on the monitor 114, the decrease permission flag is set to be "1". Thus, even when the angle of view of the image displayed on the monitor 114 changes, the image displayed on the monitor 114 is hidden behind the menu screen. In addition, it can be thought that the user pays attention to the menu screen when the menu screen is displayed. Therefore, the user does not easily notice the change in the angle of view. As a result, it is possible to reduce the visually uncomfortable feeling to be given to the user.

Fourth Embodiment

Figure 8:
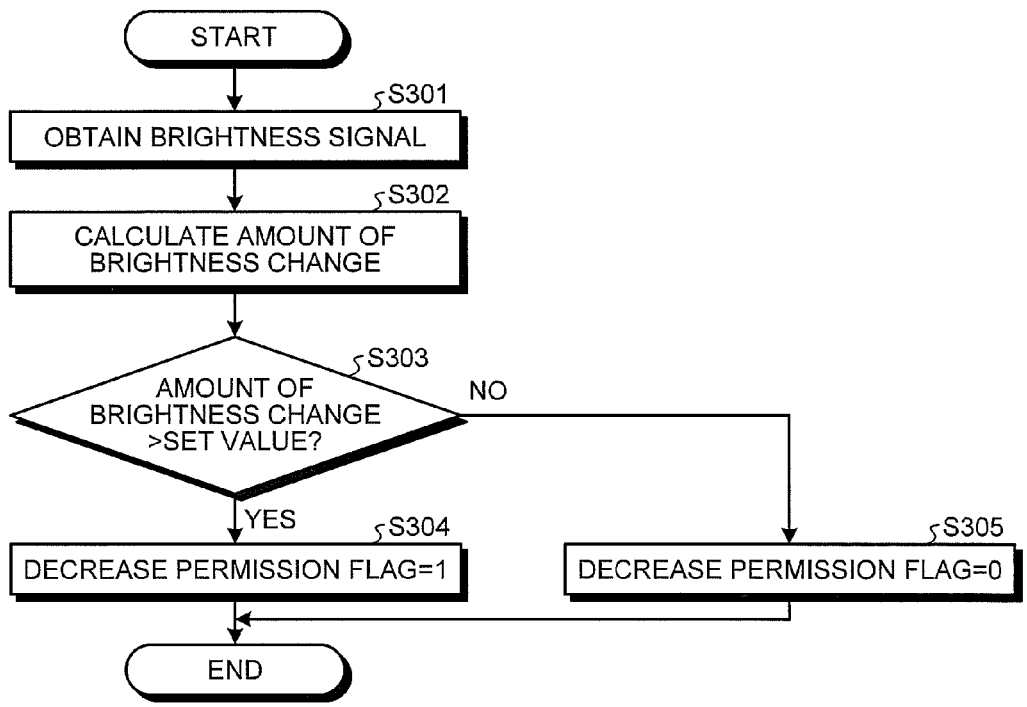
FIG. 8 is a flowchart illustrating an operation of a decrease determination unit according to a fourth embodiment.

A fourth embodiment will be described. In the present embodiment, the decrease determination unit 202 determines the value of the decrease permission flag based on image data. FIG. 8 shows a flowchart illustrating an operation of the decrease determination unit 202 according to the present embodiment.

First, the decrease determination unit 202 obtains a brightness signal of the cropping area (step S301). The brightness signal is information representing the brightness of the cropping area and is, for example, an average value of the brightness of the pixels contained in the cropping area, or the like. For example, the decrease determination unit 202 obtains the brightness signal from the camera signal processing circuit 112.

Next, the decrease determination unit 202 calculates an amount of brightness change in the cropping area by using the brightness signal (step S302). For example, the decrease determination unit 202 can calculate the amount of brightness change by comparing the brightness signal obtained at constant time intervals.

Then, the decrease determination unit 202 determines whether or not the calculated amount of brightness change is greater than a predetermined value (step S303). The predetermined value is a previously set parameter and is preferably an amount of brightness change expected while the object is changing.

If the calculated amount of brightness change is greater than the predetermined value (step S303: Yes), the decrease determination unit 202 sets the value of the decrease permission flag to be "1" (step S304). On the other hand, if the calculated amount of brightness change is equal to or smaller than the predetermined value (step S303: No), the decrease determination unit 202 sets the value of the decrease permission flag to be "0" (step S305). The decrease determination unit 202 outputs the set decrease permission flag to the decrease permission unit 201.

As described above, with the configuration of the decrease determination unit 202 according to the present embodiment, when the amount of brightness change is large, the decrease of the buffer zone is permitted. Here, in the situation that the amount of brightness change is large, an object in the image in the cropping area may be changing. In such a case, it can be thought that an image (object) in the cropping area is changing. Thus, even when the buffer zone is made small and the size of the cropping area is changed, since the user is distracted by the change of the picture, the user does not easily notice the change in the angle of view of the cropping area. As a result, it is possible to reduce the visually uncomfortable feeling to be given to the user. Note that in the above description, the amount of brightness change of the image data in the cropping area is used; however, the amount of brightness change of the picked-up image data may also be used.

Fifth Embodiment

Figure 9:
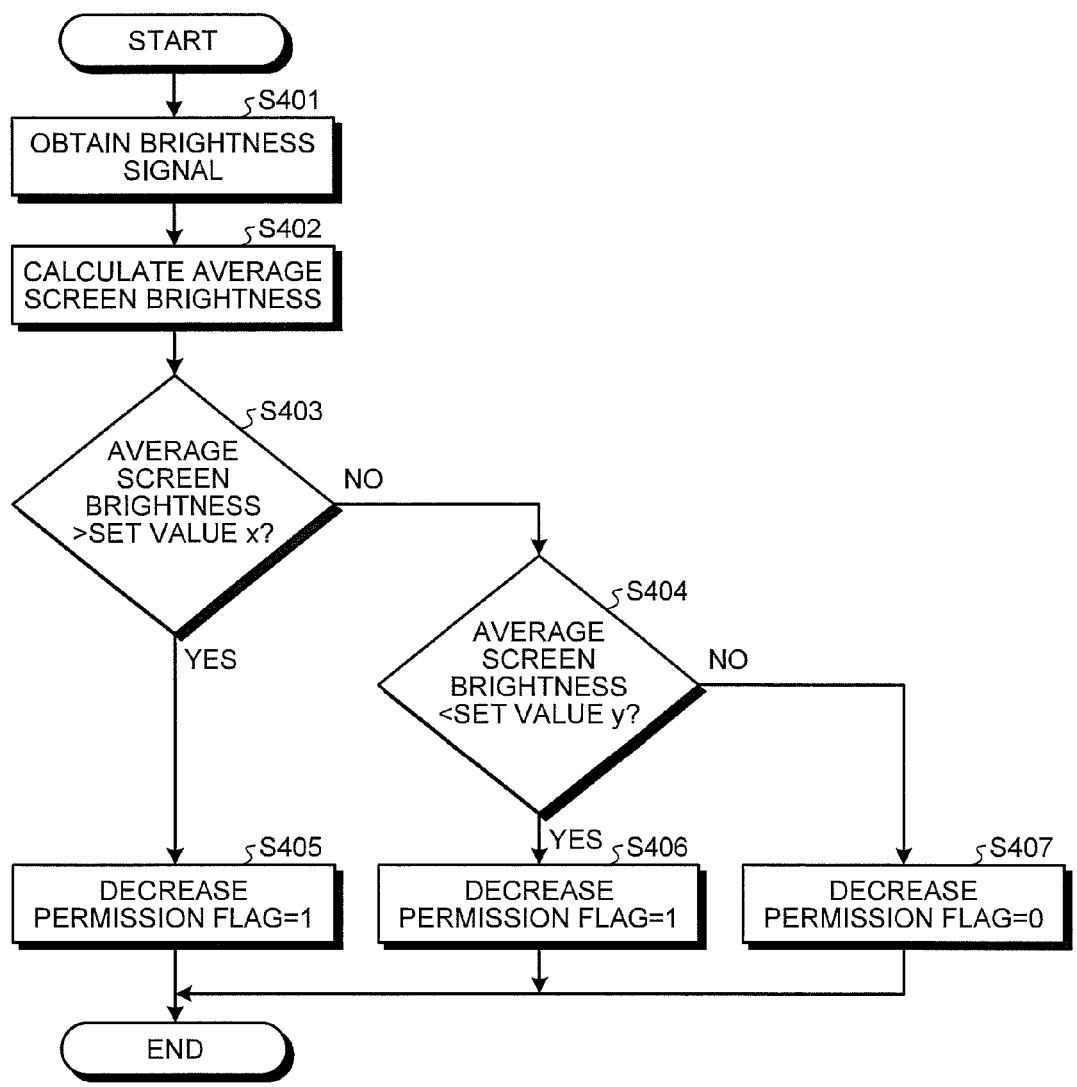
FIG. 9 is a flowchart illustrating an operation of a decrease determination unit according to a fifth embodiment.

A fifth embodiment will be described. In the present embodiment, the decrease determination unit 202 determines the value of the decrease permission flag based on image data. FIG. 9 shows a flowchart illustrating an operation of the decrease determination unit 202 according to the present embodiment.

First, the decrease determination unit 202 obtains a brightness signal of the image data in the cropping area from the camera signal processing circuit 112 (step S401). The decrease determination unit 202 calculates an average screen brightness (step S402). Specifically, the decrease determination unit 202 calculates an average value of brightnesses of the pixels contained in the cropping area. Note that when the decrease determination unit 202 calculates the brightness of the pixels, a weighted average in which the RGB of the pixels are each weighted may be used in the calculation.

Next, the decrease determination unit 202 determines whether or not the average screen brightness is higher than a set value x (step S403). The set value x is a previously set parameter and is preferably the brightness expected when the image is overexposed to white. When the average screen brightness is higher than the set value x (step S403: Yes), the decrease determination unit 202 sets the decrease permission flag to be "1" (step S405).

When the average screen brightness is equal to or smaller than the set value x (step S403: No), the decrease determination unit 202 determines whether or not the average screen brightness is lower than a set value y (step S404). The set value y is a previously set parameter and is preferably the brightness expected when the image is underexposed to black. If the average screen brightness is lower than the set value y (step S404: Yes), the decrease determination unit 202 sets the value of the decrease permission flag to be "1" (step S406).

On the other hand, if the average screen brightness is equal to or greater than the set value y (step S404: No); consequently, if the average screen brightness is equal to or smaller than the set value x and is equal to or greater than the set value y, the decrease determination unit 202 sets the value of the decrease permission flag to be "0" (step S407). The decrease determination unit 202 outputs the set decrease permission flag to the decrease permission unit 201.

As described above, with the configuration of the decrease determination unit 202 according to the present embodiment, if the average screen brightness is higher than the predetermined value x or lower than the predetermined value y, the decrease of the buffer zone is permitted. That is to say, when the image in the cropping area is overexposed to white or underexposed to black, the size of the cropping area changes. As a result, when the image in the cropping area is not sharp with an inappropriate exposure, the angle of view of the cropping area changes. Thus, even when the size of the cropping area is changed, the user does not easily notice the change in the angle of view of the cropping area. As a result, it is possible to reduce the visually uncomfortable feeling to be given to the user. Note that in the above description, the average screen brightness of the image data in the cropping area is used; however, the average screen brightness of the picked-up image data can be used.

Sixth Embodiment

Figure 10:
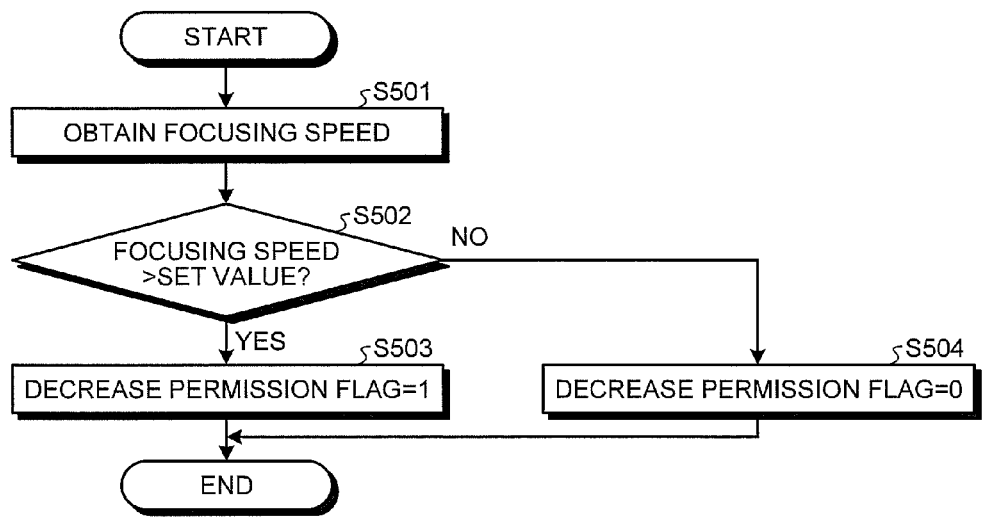
FIG. 10 is a flowchart illustrating an operation of a decrease determination unit according to a sixth embodiment.

A sixth embodiment will be described. In the present embodiment, the decrease determination unit 202 determines the value of the decrease permission flag based on a focusing speed. FIG. 10 shows a flowchart illustrating an operation of the decrease determination unit 202 according to the present embodiment.

First, the decrease determination unit 202 obtains the focusing speed from a focus control unit (not illustrated in the drawings) of the CPU (step S501). Here, the focusing speed is not a value to be set by the user's operation but a value to be set in a lens MDA (Motor Drive Actuator) from the focus control unit.

Then, the decrease determination unit 202 determines whether or not the obtained focusing speed is faster than the set value (step S502). The predetermined value is a previously set parameter. At this time, when the focusing speed is greater than the set value, it is in a situation that the focusing speed is fast to a certain extent. Thus, when the focusing is near the focused state, the image in the cropping area repeatedly changes from the slightly defocused state to the focused state and from the focused state to the slightly defocused state. On the other hand, when the focus is not near the focused state, the image in the cropping area changes from the much defocused state to the slightly defocused state and from the slightly defocused state to the focused state. That is to say, when the focusing speed is faster than the set value, the change of the picture of the image in the cropping area is easily noticed.

If the focusing speed is faster than the set value (step S502: Yes), the decrease determination unit 202 sets the value of the decrease permission flag to be "1" (step S503). On the other hand, If the focusing speed is equal to or smaller than the set value (step S502: No), the decrease determination unit 202 sets the value of the decrease permission flag to be "0" (step S504). The decrease determination unit 202 outputs the set decrease permission flag to the decrease permission unit 201.

As described above, with the configuration of the decrease determination unit 202 according to the present embodiment, when the focusing speed is faster than the set value, the decrease of the buffer zone is permitted. That is to say, in the situation that the change of the picture of the image in the cropping area is easily noticed, the size of the cropping area changes. Thus, even when the angle of view of the cropping area changes, the user does not easily notice the change in the angle of view. As a result, it is possible to reduce the visually uncomfortable feeling to be given to the user.

Seventh Embodiment

Figure 11:
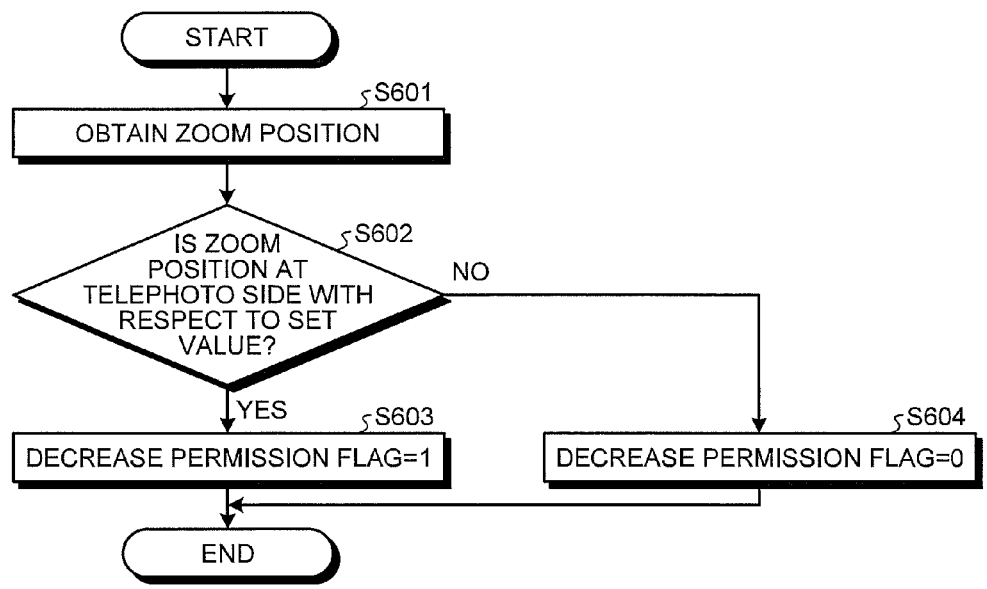
FIG. 11 is a flowchart illustrating an operation of a decrease determination unit according to a seventh embodiment.

A seventh embodiment will be described. In the present embodiment, the decrease determination unit 202 determines the value of the decrease permission flag based on an angle of view of the picked-up image. FIG. 11 shows a flowchart illustrating an operation of the decrease determination unit 202 according to the present embodiment.

First, the decrease determination unit 202 obtains a zoom position of the image pickup apparatus 1 (step S601). For example, the decrease determination unit 202 obtains the current zoom position of the image pickup apparatus 1 from the zoom control unit (not illustrated in the drawings) of the CPU.

Next, the decrease determination unit 202 determines whether or not the obtained zoom position (which is defined by the lens focus length) is on the telephoto side with respect to the set value (step S602). Note that the predetermined value is a previously set zoom position and is, for example, a zoom position at the center of the telephoto end and the wide end. If the zoom position is on the telephoto side with respect to the set value (step S602: Yes), the decrease determination unit 202 sets the value of the decrease permission flag to be "1" (step S603). On the other hand, when the zoom position is not on the telephoto side with respect to the set value (step S602: No), that is, the zoom position is on the wide side with respect to the set value, the decrease determination unit 202 sets the value of the decrease permission flag to be "0" (step S604). The decrease determination unit 202 outputs the set decrease permission flag to the decrease permission unit 201.

As described above, with the configuration of the decrease determination unit 202 according to the present embodiment, when the zoom position is on the telephoto side, the decrease of the buffer zone is permitted. Thus, in the situation that shooting is being performed at a telephoto position, the size of the cropping area changes. At this time, the change in the angle of view is not easily noticed for an image at a telephoto position than for an image at a wide position with respect to the same object. For this reason, in the case that the zoom position is on the telephoto side with respect to the predetermined value, even when the angle of view of the cropping area changes, the user does not easily notice the change in the angle of view. As a result, it is possible to reduce the visually uncomfortable feeling to be given to the user.

Eighth Embodiment

Figure 12:
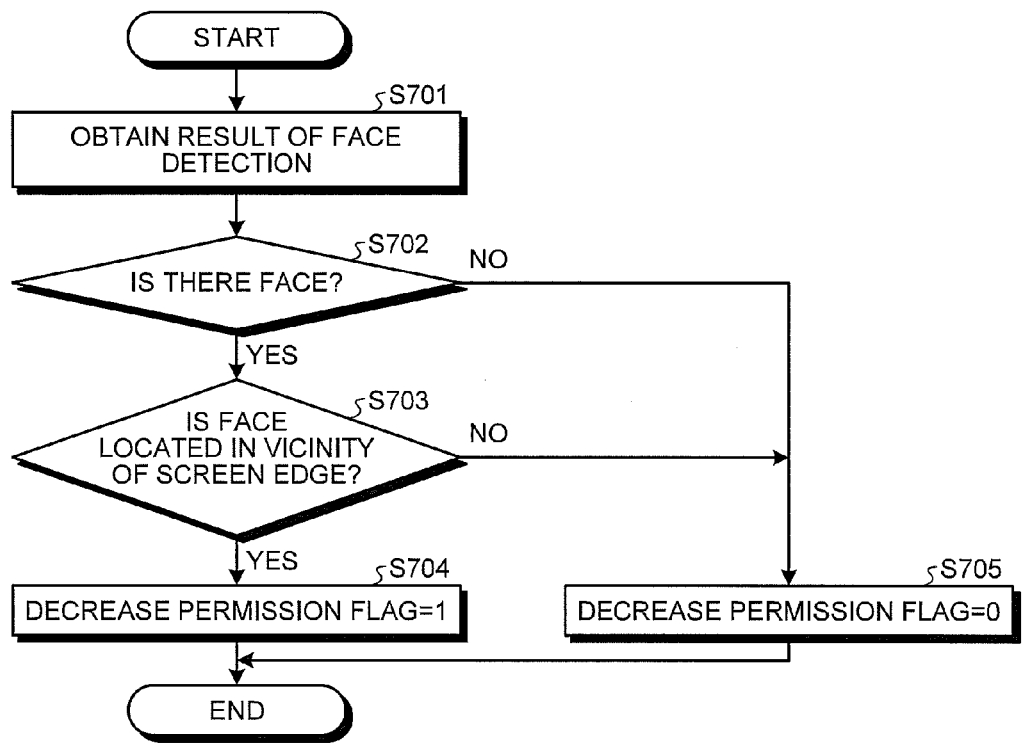
FIG. 12 is a flowchart illustrating an operation of a decrease determination unit according to an eighth embodiment.

An eighth embodiment will be described. In the present embodiment, the decrease determination unit 202 determines the value of the decrease permission flag based on image data in the cropping area. FIG. 12 shows a flowchart illustrating an operation of the decrease determination unit 202 according to the present embodiment.

First, the decrease determination unit 202 obtains a result of face detection from a face detection circuit (not illustrated in the drawings) in the CPU (step S701). Here, the face detection circuit detects a human face in the cropping area. However, the face detection circuit may detect a face in the picked-up image data.

Next, the decrease determination unit 202 refers to the result of face detection to determine whether or not there is a face in the cropping area (step S702). If a face is in the cropping area (step S702: Yes), the decrease determination unit 202 determines whether or not the position of the detected face is in the vicinity of the edge of the screen (step S703). Here, the edge of the screen represents a peripheral part of the cropping area.

If the detected face is located in the vicinity of the edge of the screen (step S703: Yes), the decrease determination unit 202 sets the value of the decrease permission flag to be "1" (step S704).

On the other hand, if a face is not detected (step S702: No) or if the face is not located in the vicinity of the edge of the screen (step S703: No), the decrease determination unit 202 sets the value of the decrease permission flag to be "0" (step S705). The decrease determination unit 202 outputs the set decrease permission flag to the decrease permission unit 201.

Figure 13:
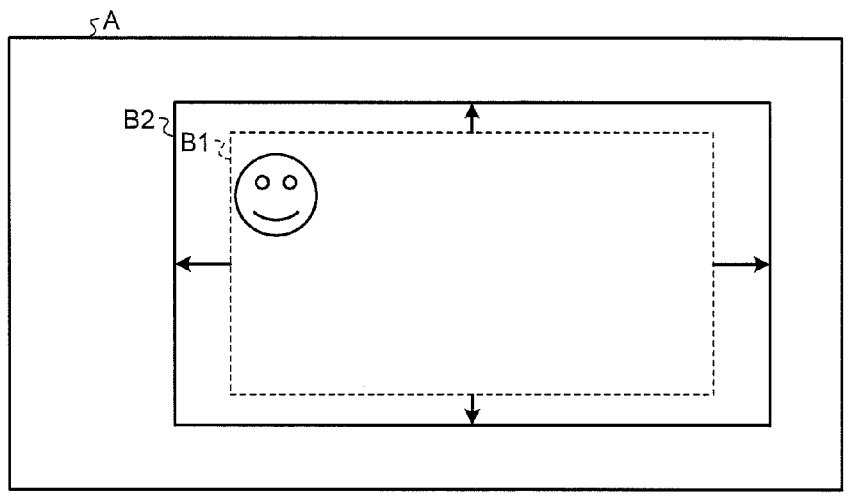
FIG. 13 is a diagram for illustrating an operation of a decrease determination unit of the eighth embodiment.

Here, with reference to FIG. 13, it will be described how to determine whether or not the position of the detected face is in the vicinity of the edge of the screen. The decrease determination unit 202 sets, when a human face comes in contact with the edge of the cropping area B1 (the broken line area) included in the picked-up image data A, the value of the decrease permission flag is set to be "1". This makes the buffer zone be decreased. That is to say, the cropping area is increased from B1 to B2 (the solid line area).

As described above, with the decrease determination unit 202 according to the present embodiment, when a human face comes close to the edge of the cropping area, the decrease of the buffer zone is permitted. This arrangement makes the user feel that the angle of view of the cropping area has been increased to follow the movement of the human face. As a result, it is possible to reduce the visually uncomfortable feeling to be given to the user.

Ninth Embodiment

Figure 14:
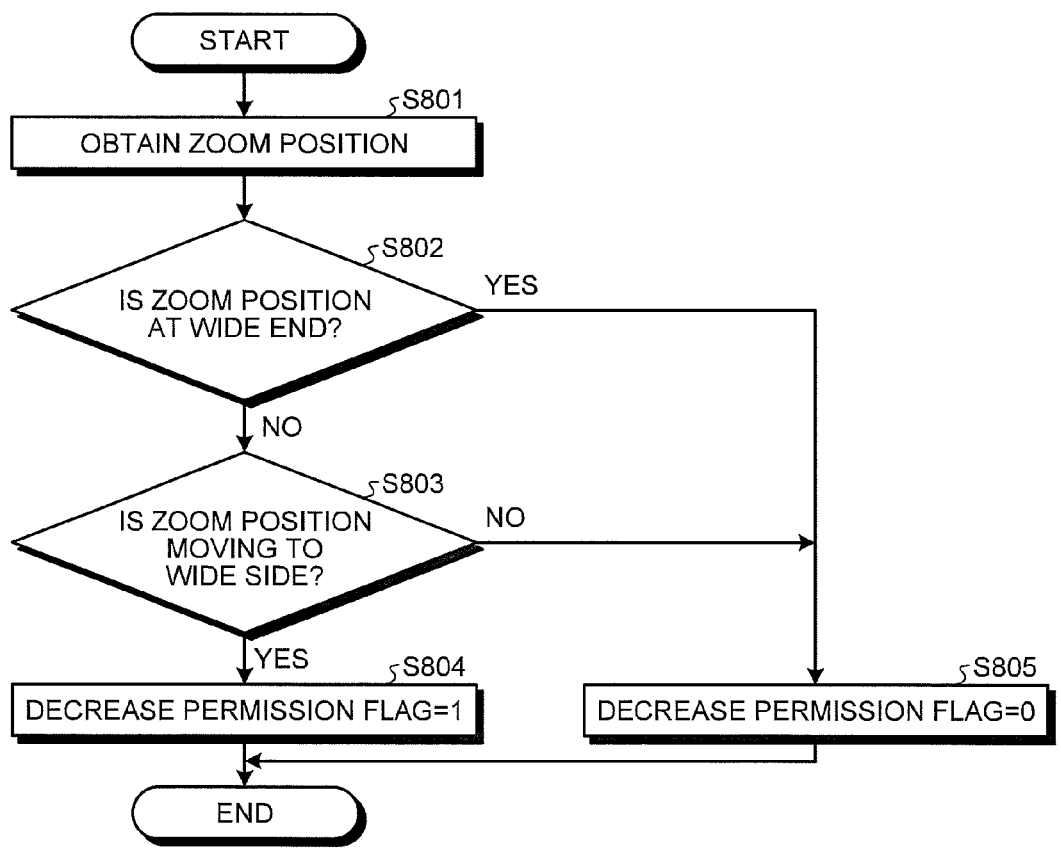
FIG. 14 is a flowchart illustrating an operation of a decrease determination unit according to a ninth embodiment.

A ninth embodiment will be described. In the present embodiment, the decrease determination unit 202 determines the value of the decrease permission flag based on a changing direction of the view angle of the picked-up image. FIG. 14 shows a flowchart illustrating an operation of the decrease determination unit 202 according to the present embodiment.

First, the decrease determination unit 202 obtains a zoom position of the image pickup apparatus 1 from the camera signal processing circuit 112 (step S801). Next, the decrease determination unit 202 refers to the obtained zoom position so as to determine whether the current zoom position is at the wide end (step S802).

If the zoom position is not at the wide end (step S802: No), the decrease determination unit 202 determines whether or not the zoom position is moving to the wide side (step S803). Here, the determination of whether or not the zoom position is moving to the wide side is performed, for example, by the decrease determination unit 202 obtaining information about existence or non-existence of a zooming operation and a zoom direction, from the zoom control unit (not illustrated in the drawings) of the CPU.

When the zoom position is moving to the wide side (step S803: Yes), the decrease determination unit 202 sets the value of the decrease permission flag to be "1" (step S804).

On the other hand, if the zoom position is at the wide end (step S802: Yes) or if the zoom position is not moving to the wide side (step S803: No), the decrease determination unit 202 sets the value of the decrease permission flag to be "0" (step S805). The decrease determination unit 202 outputs the set decrease permission flag to the decrease permission unit 201.

As described above, with the configuration of the decrease determination unit 202 according to the present embodiment, when the zoom position is moving to the wide side, the decrease of the buffer zone is permitted. That is to say, the size of the cropping area is increased in accordance with the change in the angle of view of the picked-up image to the wide-angle side. This arrangement makes the user feel that the angle of view has changed due to the zoom operation even when the angle of view of the cropping area changes. As a result, it is possible to reduce the visually uncomfortable feeling to be given to the user.

Tenth Embodiment

Figure 15:
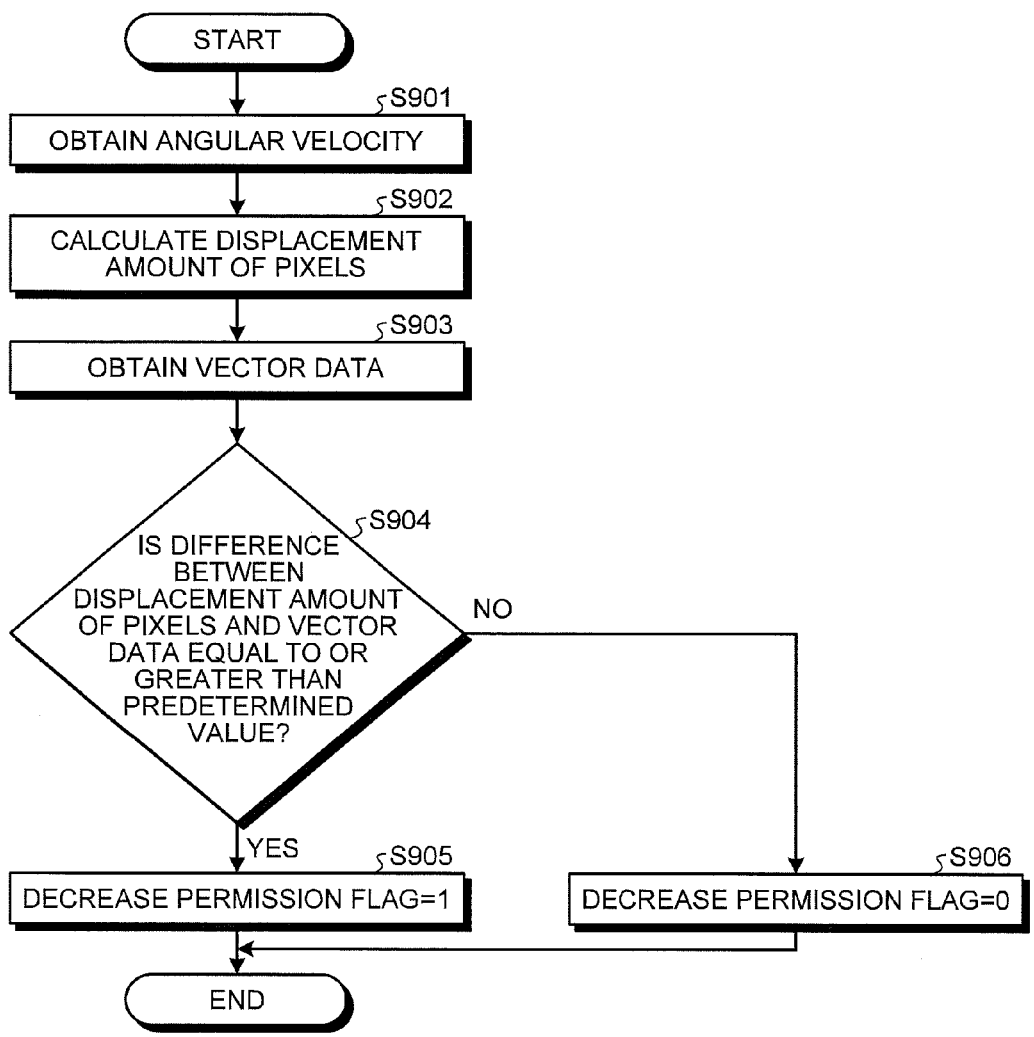
FIG. 15 is a flowchart illustrating an operation of a decrease determination unit according to a tenth embodiment.

A tenth embodiment will be described. In the present embodiment, the decrease determination unit 202 determines the value of the decrease permission flag based on a detection result and vector data by the gyro sensor 101. FIG. 15 shows a flowchart illustrating an operation of the decrease determination unit 202 according to the present embodiment.

First, the decrease determination unit 202 obtains an angular velocity from the gyro sensor 101 (step S901). Then, the decrease determination unit 202 obtains an angle of the image pickup apparatus 1 by using the obtained angular velocity, and calculates a displacement amount of pixels in the picked-up image data due to camera shake, based on the angle of the image pickup apparatus 1 (step S902).

In addition, the decrease determination unit 202 obtains a vector data representing the displacement of pixels from the motion detection circuit 1121 (step S903). The vector data (motion vector) includes the displacement amount of pixels in the picked-up image data and the information representing a displacement direction.

Here, the displacement amount of pixels which can be calculated based on the detection result of the gyro sensor 101 is the displacement amount of pixels of the image pickup apparatus 1 due to a rotation operation. Thus, the displacement amount of pixels calculated by using only the detection result of the gyro sensor 101 does not take into account the displacement amount of pixels due to a parallel displacement of the image pickup apparatus 1. On the other hand, the vector data calculated based on the positional change of pixels between frames is information in which the displacement amount of pixels due to the parallel displacement of the image pickup apparatus 1 is taken into account.

Next, the decrease determination unit 202 determines whether or not the difference between the displacement amount of pixels calculated based on the angular velocity and the displacement amount of pixels included in the vector data is equal to or greater than a predetermined value (step S904). At this time, the difference between the displacement amount of pixels calculated based on the angular velocity and the displacement amount of pixels included in the vector data is a value representing the displacement amount of pixels, out of the displacement amount of pixels included in the vector data, due to the parallel displacement of the image pickup apparatus 1. Here, the predetermined value is a previously set parameter and is preferably such a value that can be determined that the move of the pixels is caused by the parallel displacement of the image pickup apparatus 1.

If the difference is equal to or greater than the predetermined value (step S904: Yes), the decrease determination unit 202 sets the value of the decrease permission flag to be "1" (step S905). On the other hand, if the difference is smaller than the predetermined value (step S904: No), the decrease determination unit 202 sets the value of the decrease permission flag to be "0" (step S906). The decrease determination unit 202 outputs the set decrease permission flag to the decrease permission unit 201.

As described above, with the configuration of the decrease determination unit 202 according to the present embodiment, when the displacement amount of pixels included in the vector data is greater than the displacement amount of pixels calculated based on the angular velocity by a predetermined amount, the decrease of the buffer zone is permitted. That is to say, when the image pickup apparatus 1 is being parallely displaced and the picture in the picked-up image is changing, the size of the cropping area is changed. Thus, the change in the angle of view of the cropping area is not easily noticed. As a result, it is possible to reduce the visually uncomfortable feeling to be given to the user.

Eleventh Embodiment

Figure 16:
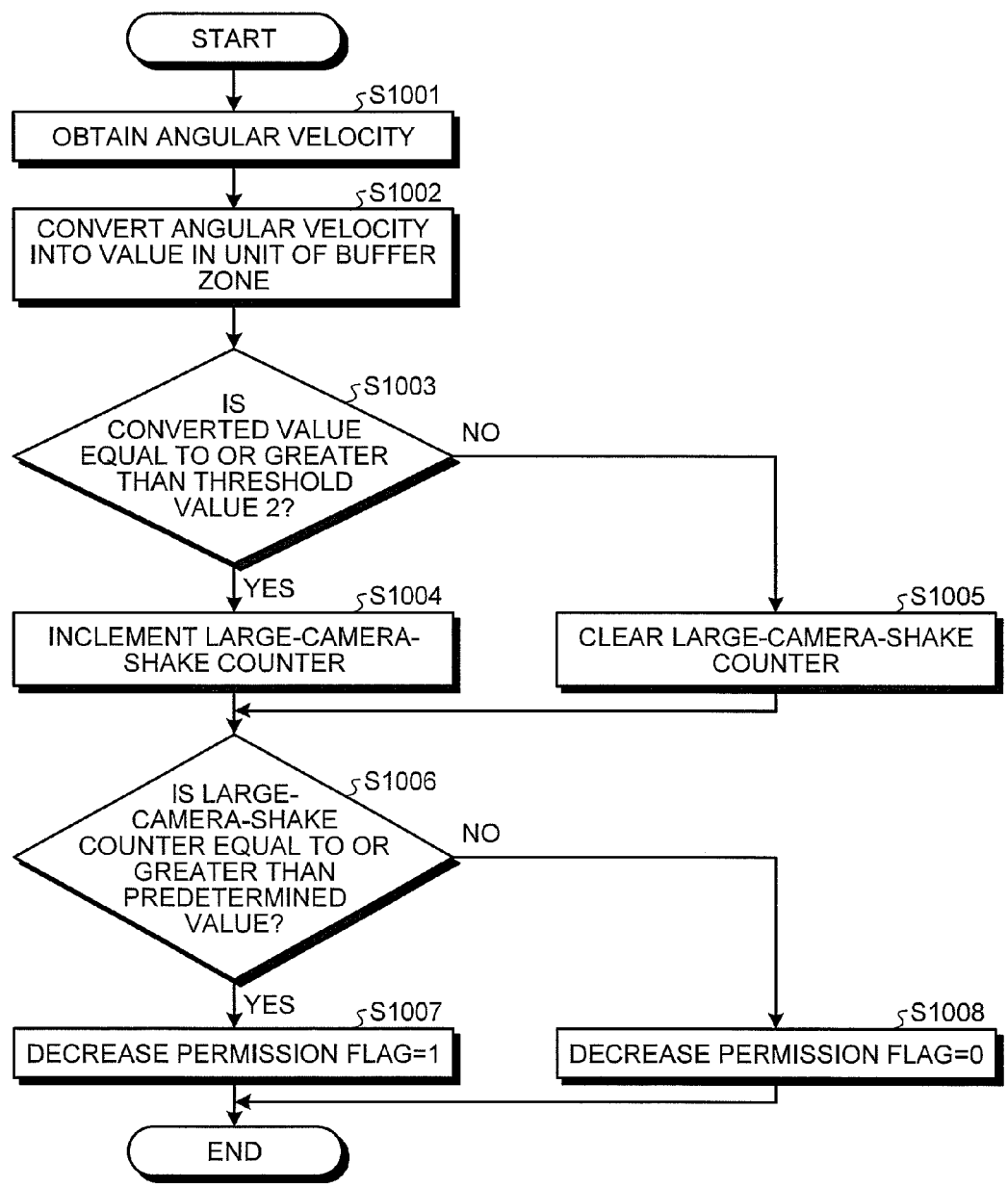
FIG. 16 is a flowchart illustrating an operation of a decrease determination unit according to an eleventh embodiment.

An eleventh embodiment will be described. In the present embodiment, the decrease determination unit 202 determines the value of the decrease permission flag based on a detection result of the gyro sensor 101. FIG. 16 shows a flowchart illustrating an operation of the decrease determination unit 202 according to the present embodiment.

First, the decrease determination unit 202 obtains an angular velocity from the gyro sensor 101 (step S1001). Next, the decrease determination unit 202 multiplies the obtained angular velocity by a coefficient K for converting the unit of the angular velocity into the unit of the buffer zone, so that the unit of the angular velocity is converted into in the unit of the buffer zone (step S1002).

Then, the decrease determination unit 202 determines whether or not the converted value, of which unit is converted into the unit of the buffer zone, is equal to or greater than a threshold value 2 (step S1003). At this time, the threshold value 2 is a value greater than a threshold value 1 (the current buffer zone AreaNow+α) used in the buffer zone determination unit 106. For example, if a constant β (β>α) is provided, the threshold value 2 is the current buffer zone AreaNow+β.

If the converted value is equal to or greater than the threshold value 2 (step S1003: Yes), the decrease determination unit 202 increments a large-camera-shake counter (step S1004). The large-camera-shake counter is a counter to count the time period (or the number of frames) for which the converted value is equal to or greater than the threshold value 2. In other words, the decrease determination unit 202 counts the time period (or the number of frames) for which the state that the converted value is equal to or greater than the threshold value 2 continues. On the other hands, If the converted value is smaller than the threshold value 2 (step S1003: No), the decrease determination unit 202 clears a count value of the large-camera-shake counter (step S1005).

Next, the decrease determination unit 202 determines whether or not the count value of the large-camera-shake counter is equal to or greater than a predetermined value (step S1006). The predetermined value is a previously set parameter and is preferably from several seconds to about a dozen seconds (several frames to about a dozen frames), for example.

If the count value of the large-camera-shake counter is equal to or greater than the predetermined value (step S1006: Yes), the decrease determination unit 202 sets the value of the decrease permission flag to be "1" (step S1007). On the other hand, the count value of the large-camera-shake counter is smaller than the predetermined value (step S1006: No), the decrease determination unit 202 sets the value of the decrease permission flag to be "0" (step S1008). The decrease determination unit 202 outputs the set decrease permission flag to the decrease permission unit 201.

Figure 17:
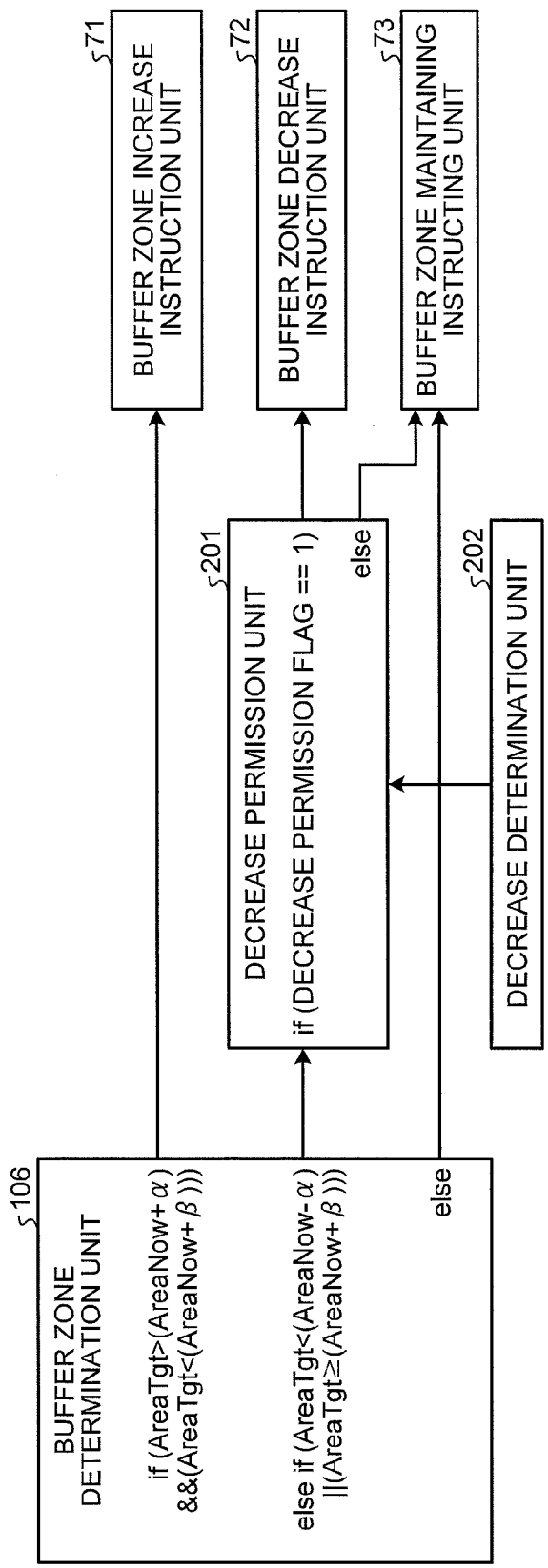
FIG. 17 is a diagram for illustrating an operation of the decrease determination unit according to the eleventh embodiment.

At this time, in order to execute, in the case that the converted value is equal to or greater than the threshold value 2 which is greater than the threshold value 1, the operational flow in which the decrease permission unit 201 permits the decrease of the buffer zone, a determination condition in the buffer zone determination unit 106 needs to be changed. FIG. 17 is a block diagram for describing the determination condition in the buffer zone determination unit 106 according to the present embodiment.

As illustrated in FIG. 17, the buffer zone determination unit 106 determines the buffer zone to be increased, when the target value AreaTgt of the buffer zone is greater than the threshold value 1 (the current buffer zone AreaNow+α) and smaller than the threshold value 2 (the current buffer zone AreaNow+β). Alternatively, the buffer zone determination unit 106 determines the buffer zone to be decreased, when the target value AreaTgt of the buffer zone is smaller than the threshold value 1 (the current buffer zone AreaNow+α) or greater than the threshold value 2 (current buffer zone AreaNow+β). By changing the condition to be as described above, the buffer zone determination unit 106 determines the buffer zone to be decreased, when the converted value is continuously greater than the threshold value 2.

As described above, with the configurations of the decrease determination unit 202 and the buffer zone determination unit 106 according to the present embodiment, when the converted value of the angular velocity due to camera shake is continuously equal to or greater than the threshold value 2 which is greater than the threshold value 1, the decrease of the buffer zone is permitted. That is to say, if the situation continues in which the camera shake cannot be sufficiently corrected even when the buffer zone is increased, the angle of view of the cropping area changes. When the situation continues in which the camera shake cannot be sufficiently corrected even if the buffer zone is increased, it can be thought that the picture in the cropping area is greatly changing. Thus, the change in the angle of view of the cropping area is not easily noticed. As a result, it is possible to reduce the visually uncomfortable feeling to be given to the user.

Twelfth Embodiment

Figure 18:
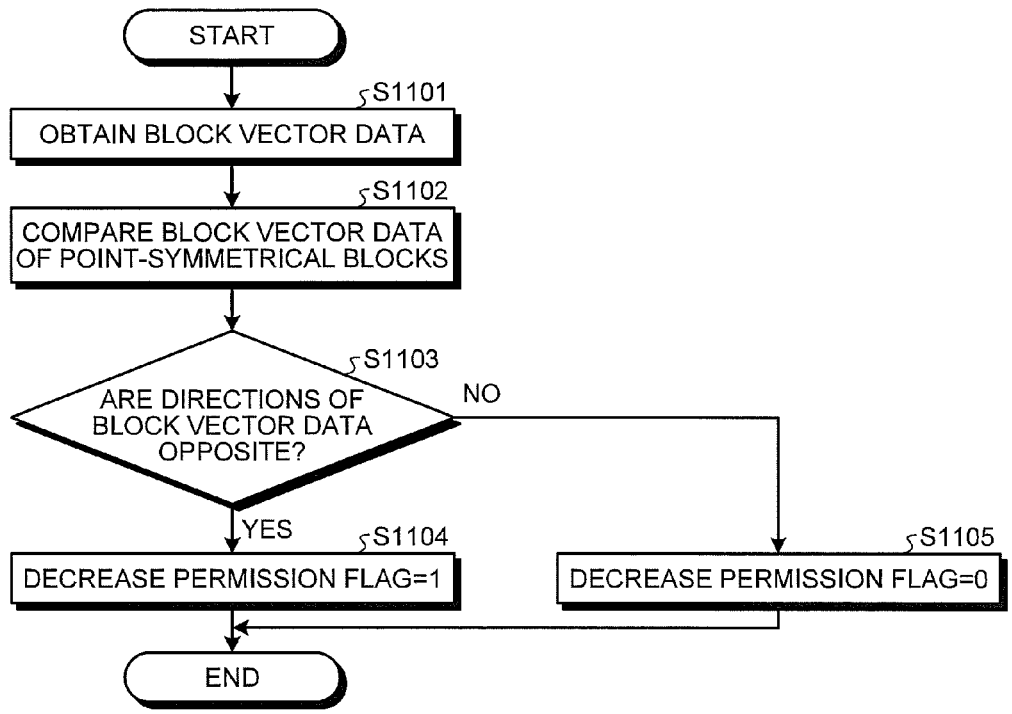
FIG. 18 is a flowchart illustrating an operation of a decrease determination unit according to a twelfth embodiment.

A twelfth embodiment will be described. In the present embodiment, the decrease determination unit 202 determines the value of the decrease permission flag based on vector data. FIG. 18 shows a flowchart illustrating an operation of the decrease determination unit 202 according to the present embodiment.

First, the decrease determination unit 202 obtains pieces of block vector data from the motion detection circuit 1121 (step S1101). Here, the pieces of block vector data are vector data in the respective blocks which are made by dividing the picked-up image data into a plurality of blocks (areas). In more detail, the blocks are a plurality of areas which are point-symmetrically located about the central point of the picked-up image data.

Figure 19:
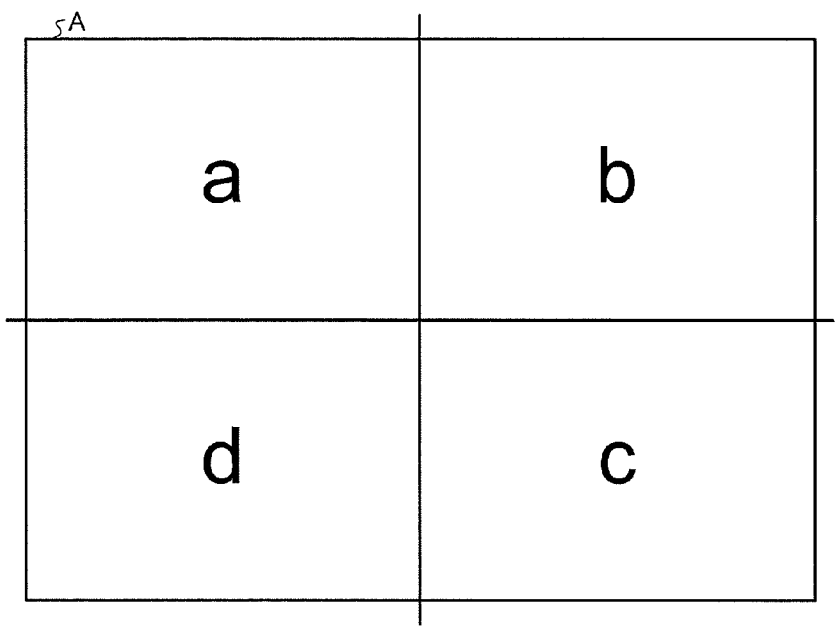
FIG. 19 is a diagram for illustrating an operation of the decrease determination unit according to the twelfth embodiment.

For example, as illustrated in FIG. 19, if the picked-up image data is vertically bisected and also horizontally bisected, the picked-up image data are divided into four blocks "a to d". In this case, the block a (the first area) and the block c (the second area) are the areas located point-symmetrically about the central point of the picked-up image data. In addition, the block b (the first area) and the block d (the second area) are the areas located point-symmetrically about the central point of the picked-up image data. The decrease determination unit 202 obtains in step S1101 the vector data of each of the blocks a to d.

Next, the decrease determination unit 202 compares the block vector data of the point-symmetrical blocks (step S1102). In the example illustrated in FIG. 19, the decrease determination unit 202 compares the vector data of the block a and the vector data of the block c. In addition, the decrease determination unit 202 compares the vector data of the block b and the vector data of the block d.

Then, the decrease determination unit 202 determines whether or not the compared block vector data are in the opposite directions (step S1103). In other words, the decrease determination unit 202 determines whether or not the directions of the displacement of pixels of the point-symmetrical blocks are opposite. Here, the case that the directions of the displacement of pixels of the point-symmetrical blocks are opposite is the case that the image pickup apparatus 1 is advancing or withdrawing in the optical axis direction. In other words, the user is walking back and forth, gripping the image pickup apparatus 1.

If the directions of the block vector data are opposite (step S1103: Yes), the decrease determination unit 202 sets the value of the decrease permission flag to be "1" (step S1104). On the other hand, if the directions of the block vector data are not opposite (step S1103: No), the decrease determination unit 202 sets the value of the decrease permission flag to be "0" (step S1105). The decrease determination unit 202 outputs the set decrease permission flag to the decrease permission unit 201.

As described above, with the configuration of the decrease determination unit 202 according to the present embodiment, when the directions of the vector data of the blocks, which are point-symmetrically located about the central point of the picked-up image data, are opposite, the decrease of the buffer zone is permitted. In other words, when the image pickup apparatus 1 is advancing or withdrawing in the optical axis direction, the angle of view of the cropping area changes. When the image pickup apparatus 1 is advancing or withdrawing in the optical axis, the image in the cropping area is changing. Thus, when the image pickup apparatus 1 is advancing or withdrawing in the optical axis direction, the change in the angle of view of the cropping area is not easily noticed. As a result, it is possible to reduce the visually uncomfortable feeling to be given to the user.

Thirteenth Embodiment

Figure 20:
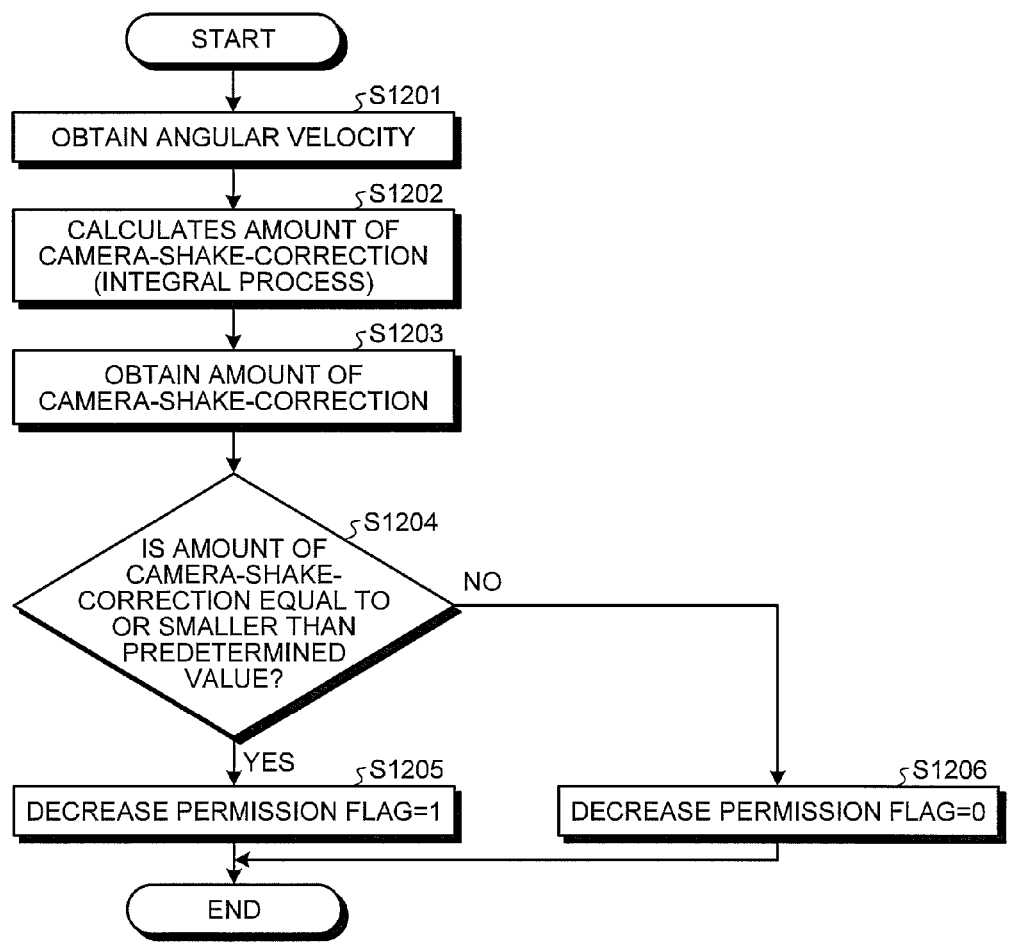
FIG. 20 is a flowchart illustrating an operation of a decrease determination unit according to a thirteenth embodiment.

A thirteenth embodiment will be described. In the present embodiment, the decrease determination unit 202 determines the value of the decrease permission flag based on an amount of camera-shake-correction. FIG. 20 shows a flowchart illustrating an operation of the decrease determination unit 202 according to the present embodiment.

First, the decrease determination unit 202 obtains an angular velocity of the image pickup apparatus 1 from the gyro sensor 101 (step S1201). Next, the decrease determination unit 202 calculates the amount of camera-shake-correction based on the obtained angular velocity (step S1202). Specifically, the decrease determination unit 202 integrates the angular velocity to calculate the angle of the image pickup apparatus 1, and calculates the amount of camera-shake-correction from the angle. The amount of camera-shake-correction at this time is a correction amount used by the memory control circuit 1122 in the electronic image stabilization process. By this process, the decrease determination unit 202 obtains the amount of camera-shake-correction (step S1203).

Then, the decrease determination unit 202 determines whether or not the obtained amount of camera-shake-correction is equal to or smaller than a predetermined value (step S1204). The predetermined value is a previously set parameter and is preferably a value smaller than the correction amount to be calculated in the situation that the image pickup apparatus 1 is gripped by a person. That is to say, the decrease determination unit 202 determines in step S1204 whether the image pickup apparatus 1 is not gripped by a person but is fixed on a tripod or the like.

If the amount of camera-shake-correction is equal to or smaller than a predetermined value (step S1204: Yes), the decrease determination unit 202 sets the value of the decrease permission flag to be "1" (step S1205). On the other hand, if the amount of camera-shake-correction is greater than the predetermined value (step S1204: No), the decrease determination unit 202 sets the value of the decrease permission flag to be "0" (step S1206). The decrease determination unit 202 outputs the set decrease permission flag to the decrease permission unit 201.

As described above, with the configuration of the decrease determination unit 202 according to the present embodiment, when the amount of camera-shake-correction is equal to or smaller than the predetermined value, the decrease of the buffer zone is permitted. That is to say, when very little camera-shake occurs in the image pickup apparatus 1, the angle of view of the cropping area changes. At this time, when the image pickup apparatus 1 is secured on a tripod or the like, the need for securing the buffer zone is low. Thus, by decreasing the buffer zone and increasing the size of the cropping area, the resolution of the cropping area can be improved.

Fourteenth Embodiment

Figure 21:
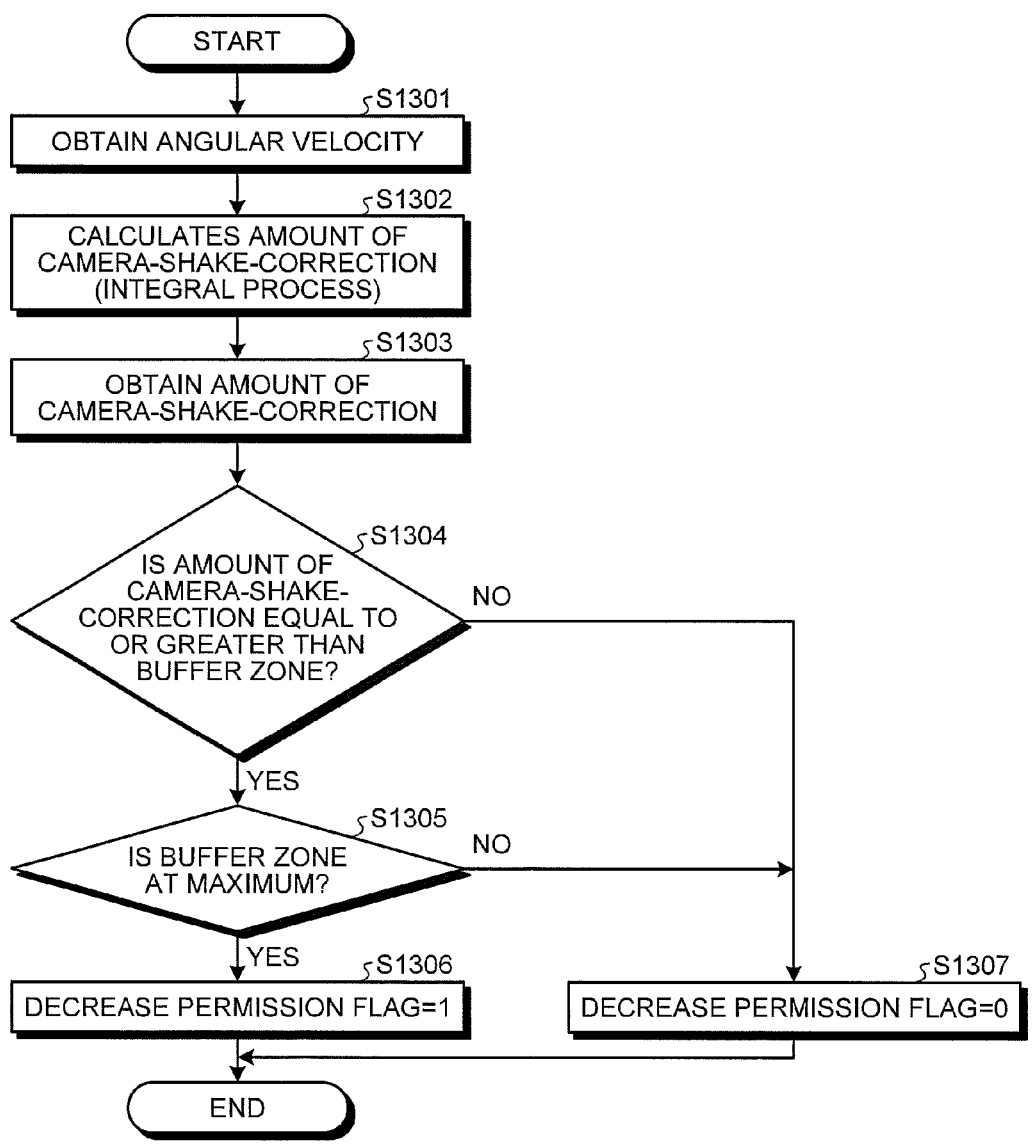
FIG. 21 is a flowchart illustrating an operation of a decrease determination unit according to a fourteenth embodiment.

A fourteenth embodiment will be described. In the present embodiment, the decrease determination unit 202 determines the value of the decrease permission flag based on an amount of camera-shake-correction. FIG. 21 shows a flowchart illustrating an operation of the decrease determination unit 202 according to the present embodiment.

First, the decrease determination unit 202 obtains an angular velocity of the image pickup apparatus 1 from the gyro sensor 101 (step S1301). Next, the decrease determination unit 202 calculates the amount of camera-shake-correction based on the obtained angular velocity (step S1302). Specifically, the decrease determination unit 202 integrates the angular velocity so as to calculate the angle of the image pickup apparatus 1, and calculates the amount of camera-shake-correction from the angle. At this time, the amount of camera-shake-correction is the correction amount used by the memory control circuit 1122 in the electronic image stabilization process. By this process, the decrease determination unit 202 obtains the amount of camera-shake-correction (step S1303). Note that the amount of camera-shake-correction is defined by a displacement amount (pixel count) of the cropping area needed to offset the shake of the cropping area. For example, suppose that the amount of camera-shake-correction in the vertical direction is p and the amount of camera-shake-correction in the lateral direction is q, the memory control circuit 1122 moves the position of the cropping area in the picked-up image data by p pixels in the lateral direction and by q pixels in the vertical direction.

Then, the decrease determination unit 202 determines whether or not the amount of camera-shake-correction is equal to or greater than the size of the current buffer zone (step S1304). At this time, the size of the buffer zone is also a value defined by a pixel count. That is to say, the size of the buffer zone is the pixel count of a margin within which the cropping area can move. For example, in a case where the margin has a size of P pixels in the lateral direction and Q pixels in the vertical direction, the memory control circuit 1122 can move the position of the cropping area in the picked-up image data by P pixels in the lateral direction and Q pixels in the vertical direction.

If the amount of camera-shake-correction is equal to or greater than the size of the current buffer zone (step S1304: Yes), the decrease determination unit 202 determines whether or not the current buffer zone is at a maximum size (step S1305). Note that the maximum size of the buffer zone is previously set. At this time, the case where the amount of camera-shake-correction is equal to or greater than the size of the current buffer zone is the case where the number of pixels to be moved in the image stabilization process is equal to or greater than the pixel count of the margin within which the cropping area can move. In other words, it is the case where the size of the current buffer zone cannot fully correct the camera shake.

If the amount of camera-shake-correction is equal to or greater than the size of the current buffer zone (step S1304: Yes), and if the current buffer zone is at the maximum size (step S1305: Yes), the decrease determination unit 202 sets the value of the decrease permission flag to be "1" (step S1306). On the other hand, if the amount of camera-shake-correction is smaller than the size of the current buffer zone (step S1304: No), or if the size of the current buffer zone is not a maximum value (step S1305: No), the decrease determination unit 202 sets the value of the decrease permission flag to be "0" (step S1307). The decrease determination unit 202 outputs the set decrease permission flag to the decrease permission unit 201.

Figure 22:
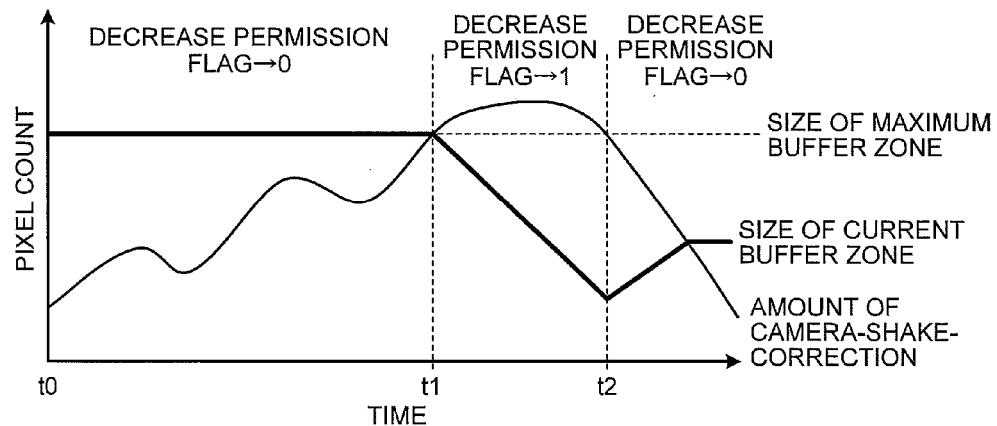
FIG. 22 is a diagram for illustrating an operation of a decrease determination unit according to a fourteenth embodiment.

Here, with reference to the graph in FIG. 22, how the size of the buffer zone changes will be described. In the graph illustrated in FIG. 22, the vertical axis represents a pixel count, and the horizontal axis represents time. Suppose that, at an initial state (time t0), the size of the current buffer zone is at the maximum size of the buffer zone. From the time t0 to the time t1, the amount of camera-shake-correction increases. When the amount of camera-shake-correction is smaller than the size of the current buffer zone, the image pickup apparatus 1 can correct the camera shake by moving the position of the cropping area. At this time, since the amount of camera-shake-correction is smaller than the size of the buffer zone, the decrease determination unit 202 sets the value of the decrease permission flag to be "0".

At the time t1, the decrease determination unit 202 determines whether or not the camera shake amount is equal to or greater than the size of the current buffer zone. Then, the decrease determination unit 202 determines, when the camera shake amount becomes equal to or greater than the size of the current buffer zone, whether or not the current buffer zone is at the maximum size. In the example in FIG. 22, since the amount of camera-shake-correction is equal to or greater than the size of the current buffer zone and the current buffer zone is at the maximum size, the value of the decrease permission flag is changed from "0" to "1". Since this allows the buffer zone to be decreased, the size of the current buffer zone decreases from the time t1 to the time t2. Then, when the camera shake amount gets back to a value smaller than the maximum size of the buffer zone, the decrease determination unit 202 changes the value of a decrease permission flag from "1" to "0". Further, the image pickup apparatus 1 increases the size of the current buffer zone again.

As described above, with the configuration of the decrease determination unit 202 according to the present embodiment, when the amount of camera-shake-correction is equal to or greater than the size of the current buffer zone and when the current buffer zone is at the maximum size, the decrease of the buffer zone is permitted. That is to say, when the camera shake cannot be fully corrected with the buffer zone having the maximum size, the size of the cropping area changes. When the camera shake cannot be fully corrected with the buffer zone having the maximum size, it can be thought that the picture in the cropping area is much changing. Thus, the change in the angle of view of the cropping area is not easily noticed. As a result, it is possible to reduce the visually uncomfortable feeling to be given to the user.

Fifteenth Embodiment

Figure 23:
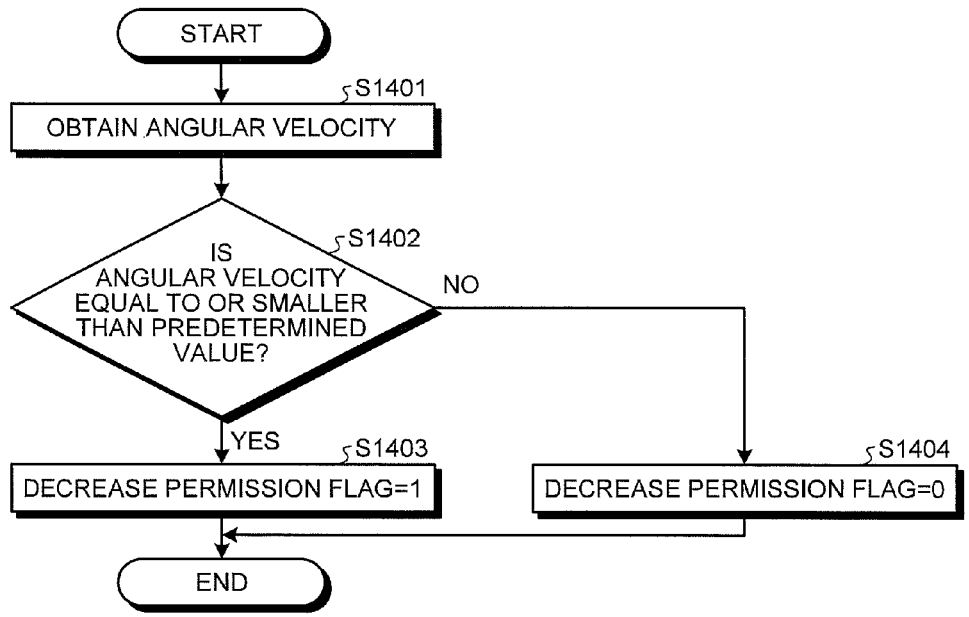
FIG. 23 is a flowchart illustrating an operation of a decrease determination unit according to a fifteenth embodiment.

A fifteenth embodiment will be described. In the present embodiment, the decrease determination unit 202 determines the value of the decrease permission flag based on a detection result by the gyro sensor 101. FIG. 23 shows a flowchart illustrating an operation of the decrease determination unit 202 according to the present embodiment.

First, the decrease determination unit 202 obtains an angular velocity of the image pickup apparatus 1 from the gyro sensor 101 (step S1401). Then, the decrease determination unit 202 determines whether or not the obtained angular velocity is equal to or smaller than a predetermined value (step S1402). The predetermined value is a previously set parameter and preferably is smaller than the angular velocity to be calculated in the situation that a person is gripping the image pickup apparatus 1. That is to say, the decrease determination unit 202 determines in step S1402 whether the image pickup apparatus 1 is not gripped by a person but fixed on a tripod or the like.

If the angular velocity is equal to or smaller than the predetermined value (step S1402: Yes), the decrease determination unit 202 sets the value of the decrease permission flag to be "1" (step S1403). On the other hand, if the angular velocity is greater than the predetermined value (step S1402: No), the decrease determination unit 202 sets the value of the decrease permission flag to be "0" (step S1404). The decrease determination unit 202 outputs the set decrease permission flag to the decrease permission unit 201.

As described above, with the configuration of the decrease determination unit 202 according to the present embodiment, when the angular velocity is equal to or smaller than a predetermined value, the decrease of the buffer zone is permitted. That is to say, when very little camera shake occurs in the image pickup apparatus 1, the angle of view of the cropping area changes. At this time, when the image pickup apparatus 1 is secured on a tripod or the like, the need for securing the buffer zone is low. Thus, by decreasing the buffer zone and increasing the size of the cropping area, the resolution of the cropping area can be improved.

Sixteenth Embodiment

Figure 24:
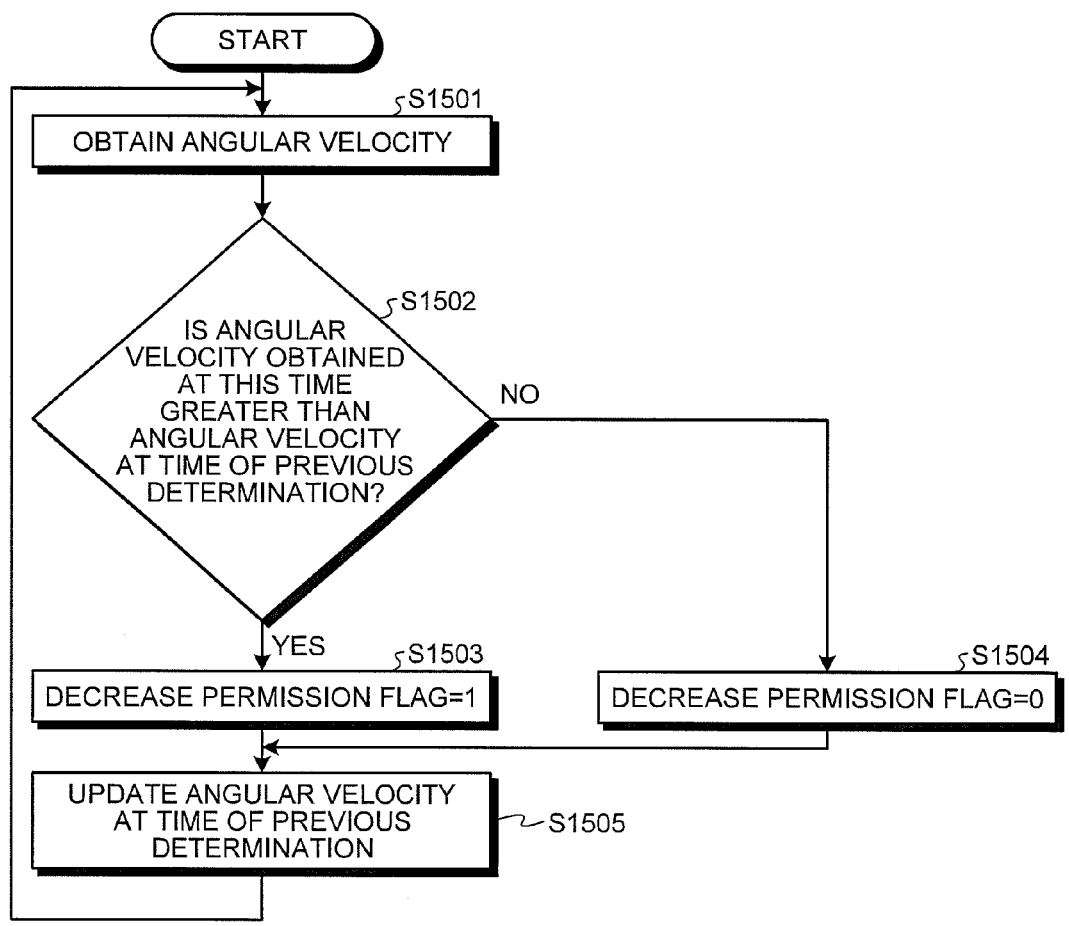
FIG. 24 is a flowchart illustrating an operation of a decrease determination unit according to a sixteenth embodiment.

A sixteenth embodiment will be described. In the present embodiment, the decrease determination unit 202 determines the value of the decrease permission flag based on a detection result of the gyro sensor 101. FIG. 24 shows a flowchart illustrating an operation of the decrease determination unit 202 according to the present embodiment.

First, the decrease determination unit 202 obtains an angular velocity of the image pickup apparatus 1 from the gyro sensor 101 (step S1501). Then, the decrease determination unit 202 determines whether or not the angular velocity obtained at this time (the angular velocity obtained in step S1501) is greater than the angular velocity at the time of previous determination (step S1502). At this time, the decrease determination unit 202 performs the determination in step S1502 every predetermined time period, and the angular velocity at the time of previous determination is held in a memory (not illustrated in the drawings).

When the angular velocity obtained at this time is greater than the angular velocity at the time of previous determination (step S1502: Yes), the decrease determination unit 202 sets the value of the decrease permission flag to be "1" (step S1503). On the other hand, the angular velocity obtained at this time is equal to or smaller than the angular velocity at the time of previous determination (step S1502: No), the decrease determination unit 202 sets the value of the decrease permission flag to be "0" (step S1504). The decrease determination unit 202 outputs the set decrease permission flag to the decrease permission unit 201.

Then, the decrease determination unit 202 updates the angular velocity at the time of previous determination (step S1505). Specifically, the decrease determination unit 202 stores the angular velocity obtained in step S1501 in a memory (not illustrated in the drawings) as the angular velocity at the time of previous determination. Then, the decrease determination unit 202 newly obtains the angular velocity from the gyro sensor 101 after a predetermined time (step S1501). The decrease determination unit 202 compares the angular velocity (the angular velocity obtained at this time) obtained in step S1501 with the angular velocity (the angular velocity at the time of previous determination) stored in the memory in step S1505 (step S1502). As described above, the decrease determination unit 202 repeats the above operation and sets the value of the decrease permission flag.

As described above, with the configuration of the decrease determination unit 202 according to the present embodiment, when the angular velocity obtained at this time is greater than the angular velocity at the time of previous determination, the decrease of the buffer zone is permitted. That is to say, when the image pickup apparatus 1 is performing a rotating operation (panning or tilting) at an accelerated rate, the angle of view of the cropping area is changed. While panning or tilting, a picture in the cropping area changes. Thus, while panning or tilting, the change in the angle of view of the cropping area is not easily noticed. As a result, it is possible to reduce the visually uncomfortable feeling to be given to the user.

Other Embodiments

Other embodiments will be described. In the above-described embodiment, the maximum value and the minimum value of the buffer zone are previously set, but the maximum value and the minimum value of the buffer zone may be set by a user.

Alternatively, the size of the buffer zone (the size of the cropping area) may be changed manually by a user. Further, the image pickup apparatus 1 may be equipped with a memory for storing the size of the buffer zone that is set by a user, and may use the size of the buffer zone stored in the memory as an initial value of the size of the buffer zone at the time of the next and later activation of the image pickup apparatus 1.

Figure 25:
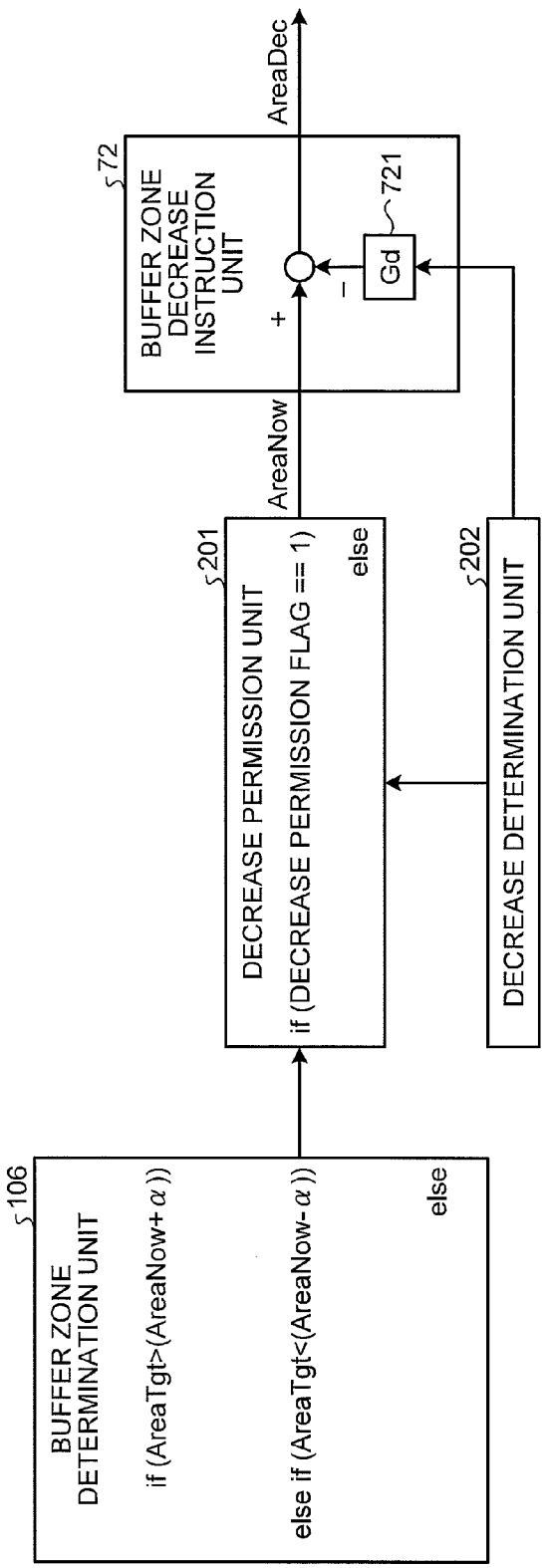
FIG. 25 is a diagram for illustrating an operation of a buffer zone decrease instruction unit according to other embodiments.

Further, in the above-described embodiment, the buffer zone decrease instruction unit 72 decreases the buffer zone by using the previously set decrease-amount (fixed value); however, a variable decrease-amount may be used. For example, as illustrated in the block diagram in FIG. 25, the buffer zone decrease instruction unit 72 may have a decrease-amount adjustment unit 721. The decrease-amount adjustment unit 721 adjusts a decrease-amount Gd depending on an instruction from the decrease determination unit 202. Specifically, the decrease-amount adjustment unit 721 adjusts the decrease-amount Gd depending on a degree of the determination by the decrease determination unit 202.

For example, when the amount of brightness change is much larger than the set value in the determination based on the amount of brightness change described with reference to FIG. 8, the value of the decrease-amount Gd is made larger than a previously set standard value, whereby the size of the buffer zone is largely changed (decreased). On the other hand, when the amount of brightness change is slightly larger than the set value, the value of the decrease-amount Gd is made smaller than the previously set standard value, whereby the size of the buffer zone is a little changed (decreased). With this arrangement, the image pickup apparatus 1 can dynamically change the size of the buffer zone depending on the image pickup condition.

The present invention provides an image pickup apparatus and an image pickup method in which the size of the cropping area in the picked-up image data is appropriately set.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image pickup apparatus comprising:
  an image pickup unit configured to generate picked-up image data by an image pickup process;
  a camera shake detection unit configured to detect an angular velocity gnereated by camera shake when shooting;
  an electronic image stabilization unit configured to perform an image stabilization process by moving a position of a cropping area in the picked-up image data based on the angular velocity detected by the camera shake detection unit;
  a target-value-of-area calculation unit configured to calculate a target value of a size of the cropping area based on the angular velocity;
  a change determination unit configured to compare the target value calculated by the target-value-of-area calculation unit and the size of the cropping area at present and to determine whether or not to change the size of the cropping area at present based on a result of the comparison; and
  an area changing unit configured to change the size of the cropping area with respect to the picked-up image data based on a result of the determination of the change determination unit.

2. The image pickup apparatus of claim 1, further comprising
  a permission unit configured to permit the area changing unit to increase the size of the cropping area.

3. The image pickup apparatus of claim 2, further comprising
  a condition determination unit configured to determine whether or not an image pickup condition which allows the size of the cropping area to be increased is satisfied, wherein the permission unit permits the area changing unit to increase the size of the cropping area based on a result of the determination by the condition determination unit.

4. The image pickup apparatus of claim 3, wherein
  the condition determination unit determines whether or not the image pickup apparatus is being in a recording operation.

5. The image pickup apparatus of claim 3, wherein
  the condition determination unit determines whether or not a display unit of the image pickup apparatus is displaying a menu.

6. The image pickup apparatus of claim 3, wherein
  the condition determination unit
    obtains an amount of brightness change of the cropping area and
    determines whether or not the image pickup condition which allows the size of the cropping area to be increased is satisfied based on the amount of brightness change.

7. The image pickup apparatus of claim 3, wherein
  the condition determination unit
    obtains an average brightness of the cropping area and
    determines whether or not the image pickup condition which allows the size of the cropping area to be increased is satisfied based on the average brightness.

8. The image pickup apparatus of claim 3, wherein
  the condition determination unit
    obtains a focusing speed of the image pickup apparatus and determines whether or not the image pickup condition which allows the size of the cropping area to be increased is satisfied based on the focusing speed.

9. The image pickup apparatus of claim 3, wherein the condition determination unit
obtains a zoom position of the image pickup apparatus and
determines whether or not the image pickup condition which allows the size of the cropping area to be increased is satisfied based on the zoom position.

10. The image pickup apparatus of claim 3, wherein the condition determination unit
determines whether or not a human face existing in the cropping area is located on a peripheral part of the cropping area.

11. The image pickup apparatus of claim 3, wherein the condition determination unit determines whether or not the image pickup condition which allows the size of the cropping area to be increased is satisfied based on change in a zoom position of the image pickup apparatus.

12. The image pickup apparatus of claim 3, wherein the condition determination unit
obtains a motion vector of the picked-up image data,
calculates a displacement amount of pixels of the picked-up image data based on the angular velocity detected by the camera shake detection unit, and
determines whether or not the image pickup condition which allows the size of the cropping area to be increased is satisfied based on a difference between a displacement amount of the motion vector and the calculated displacement amount of pixels.

13. The image pickup apparatus of claim 3, wherein the condition determination unit determines whether or not camera shake having an angular velocity equal to or greater than a predetermined value has continued for a predetermined time or longer based on the angular velocity detected by the camera shake detection unit.

14. The image pickup apparatus of claim 3, wherein the condition determination unit
obtains a motion vector of pixels in a first area of the picked-up image data,
obtains a motion vector of a second area which is located point-symmetrically to the first area about a central point of the picked-up image data, and
determines whether or not a direction of a motion vector of the first area and a direction of a motion vector of the second area are opposite.

15. The image pickup apparatus of claim 3, wherein the condition determination unit
calculates an amount of camera-shake-correction based on the angular velocity detected by the camera shake detection unit, and
determines whether or not the amount of camera-shake-correction is equal to or greater than a distance in which the cropping area can travel in the picked-up image data, and the size of the cropping area is at a minimum.

16. The image pickup apparatus of claim 3, wherein the condition determination unit determines whether or not the image pickup condition which allows the size of the cropping area to be increased is satisfied based on the angular velocity detected by the camera shake detection unit.

17. The image pickup apparatus of claim 3, wherein the condition determination unit determines whether or not the image pickup apparatus is being in a pan operation or in a tilt operation.

18. An image pickup method comprising:
generating picked-up image data by an image pickup process;
detecting an angular velocity generated by camera shake when shooting;
performing an image stabilization process by moving a position of a cropping area in the picked-up image data based on the detected angular velocity;
calculating a target value of a size of the cropping area based on the angular velocity;
comparing the target value and the size of the cropping area at present and determining whether or not to change the size of the cropping area at present based on a result of the comparison; and
changing the size of the cropping area with respect to the picked-up image data based on a result of the determination.

19. A computer program product comprising a non-transitory computer-usable medium having computer-readable program codes embodied in the medium, wherein the program codes when executed causing a computer to execute the image pick up method according to claim 18.

* * * * *

UNITED STATES PATENT AND TRADEMARK OFFICE
CERTIFICATE OF CORRECTION

PATENT NO. : 9,319,587 B2
APPLICATION NO. : 14/244659
DATED : April 19, 2016
INVENTOR(S) : Takao et al.

It is certified that error appears in the above-identified patent and that said Letters Patent is hereby corrected as shown below:

Claims

In claim 1, column 22, line 10, replace "gnereated" with --generated--.

Signed and Sealed this
Twelfth Day of July, 2016

Michelle K. Lee
*Director of the United States Patent and Trademark Office*